(12) United States Patent
Sekido et al.

(10) Patent No.: US 7,943,078 B2
(45) Date of Patent: May 17, 2011

(54) RTM MOLDING METHOD AND DEVICE

(75) Inventors: Toshihide Sekido, Otsu (JP); Shigeo Iwasawa, Matsuyama (JP); Tatsuya Senba, Iyo-gun (JP)

(73) Assignee: Toray Industries, Inc. (JP)

( * ) Notice: Subject to any disclaimer, the term of this patent is extended or adjusted under 35 U.S.C. 154(b) by 551 days.

(21) Appl. No.: 10/589,589

(22) PCT Filed: Feb. 16, 2005

(86) PCT No.: PCT/JP2005/002314
§ 371 (c)(1),
(2), (4) Date: Aug. 16, 2006

(87) PCT Pub. No.: WO2005/077632
PCT Pub. Date: Aug. 25, 2005

(65) Prior Publication Data
US 2007/0182071 A1    Aug. 9, 2007

(30) Foreign Application Priority Data

Feb. 17, 2004 (JP) .................................. 2004-039882
Mar. 8, 2004 (JP) .................................. 2004-063777
Sep. 28, 2004 (JP) .................................. 2004-281611

(51) Int. Cl.
*B29C 70/48* (2006.01)
(52) U.S. Cl. .................. 264/328.8; 264/257; 264/328.2; 425/120; 425/405.1; 425/573
(58) Field of Classification Search .................. 425/573, 425/120, 405.1; 264/328.2, 328.8, 257
See application file for complete search history.

(56) References Cited

U.S. PATENT DOCUMENTS

| 4,132,755 A | * | 1/1979 | Johnson | ......................... 264/553 |
| 4,724,115 A | | 2/1988 | Freeman | |
| 4,743,323 A | * | 5/1988 | Hettinga | ....................... 156/160 |

(Continued)

FOREIGN PATENT DOCUMENTS
DE    198 50 462 A1    5/2000
(Continued)

OTHER PUBLICATIONS
Machine Translation for JP2001-062932.*
(Continued)

*Primary Examiner* — Richard Crispino
*Assistant Examiner* — Robert Dye
(74) *Attorney, Agent, or Firm* — DLA Piper LLP (US)

(57) ABSTRACT

An RTM molding method includes disposing a reinforcing fiber substrate in a cavity of a mold consisting of a plurality of dies, clamping the mold, and thereafter injecting resin to complete molding, characterized in that divided areas with respect to the surface direction of the reinforcing fiber substrate are assumed, each divided area is one in which injected resin expands over the entire surface in the area and can be substantially uniformly impregnated in the thickness direction of the substrate, and resin introducing paths are formed for respective assumed divided areas for introducing the injected resin into the respective divided areas; and an RTM molding device. When a relatively large molded product is to be molded, a molding step from resin injection to impregnating/curing can be implemented at high speed without generating a non-resin-flowing area, thereby enabling a high-quality molded product to be produced free from voids, etc., with a molding time shortened and production speed and volume increased.

27 Claims, 22 Drawing Sheets

U.S. PATENT DOCUMENTS

| | | | |
|---|---|---|---|
| 4,942,013 A | 7/1990 | Palmer et al. | |
| 4,952,135 A | 8/1990 | Douglas | |
| 5,052,906 A | 10/1991 | Seemann | |
| 5,248,467 A * | 9/1993 | Cushman | 264/102 |
| 5,439,635 A * | 8/1995 | Seemann | 264/510 |
| 5,565,162 A * | 10/1996 | Foster | 264/257 |
| 5,921,754 A * | 7/1999 | Freitas et al. | 416/230 |
| 6,203,749 B1 * | 3/2001 | Loving | 264/510 |
| 6,560,843 B2 * | 5/2003 | Cundiff et al. | 29/455.1 |
| 7,517,481 B2 * | 4/2009 | Advani et al. | 264/40.5 |
| 2002/0022422 A1 * | 2/2002 | Waldrop et al. | 442/179 |

FOREIGN PATENT DOCUMENTS

| | | |
|---|---|---|
| JP | 55-123423 A | 9/1980 |
| JP | 62-282912 A | 12/1987 |
| JP | 63-022618 A | 1/1988 |
| JP | 8-58008 A | 3/1996 |
| JP | 9-272131 A | 10/1997 |
| JP | 2001-18230 A | 1/2001 |
| JP | 2001-062932 | 3/2001 |
| JP | 2002-127220 A | 5/2002 |
| JP | 2002-234078 A | 8/2002 |
| JP | 2002-347084 A | 12/2002 |
| JP | 2003-11136 A | 1/2003 |
| JP | 2003-025347 | 1/2003 |
| JP | 2003-39455 A | 2/2003 |
| JP | 2003-53744 A | 2/2003 |
| JP | 2003-118019 | 4/2003 |
| JP | 2003-305719 A | 10/2003 |

OTHER PUBLICATIONS

Machine Translation for JP2003-025347.*

F.C. Campbell: "Manufacturing Processes for Advanced Composites," 2004, Elsevier, Oxford, UK, XP002565382; ISBN: 1856174158; pp. 331-341.

* cited by examiner

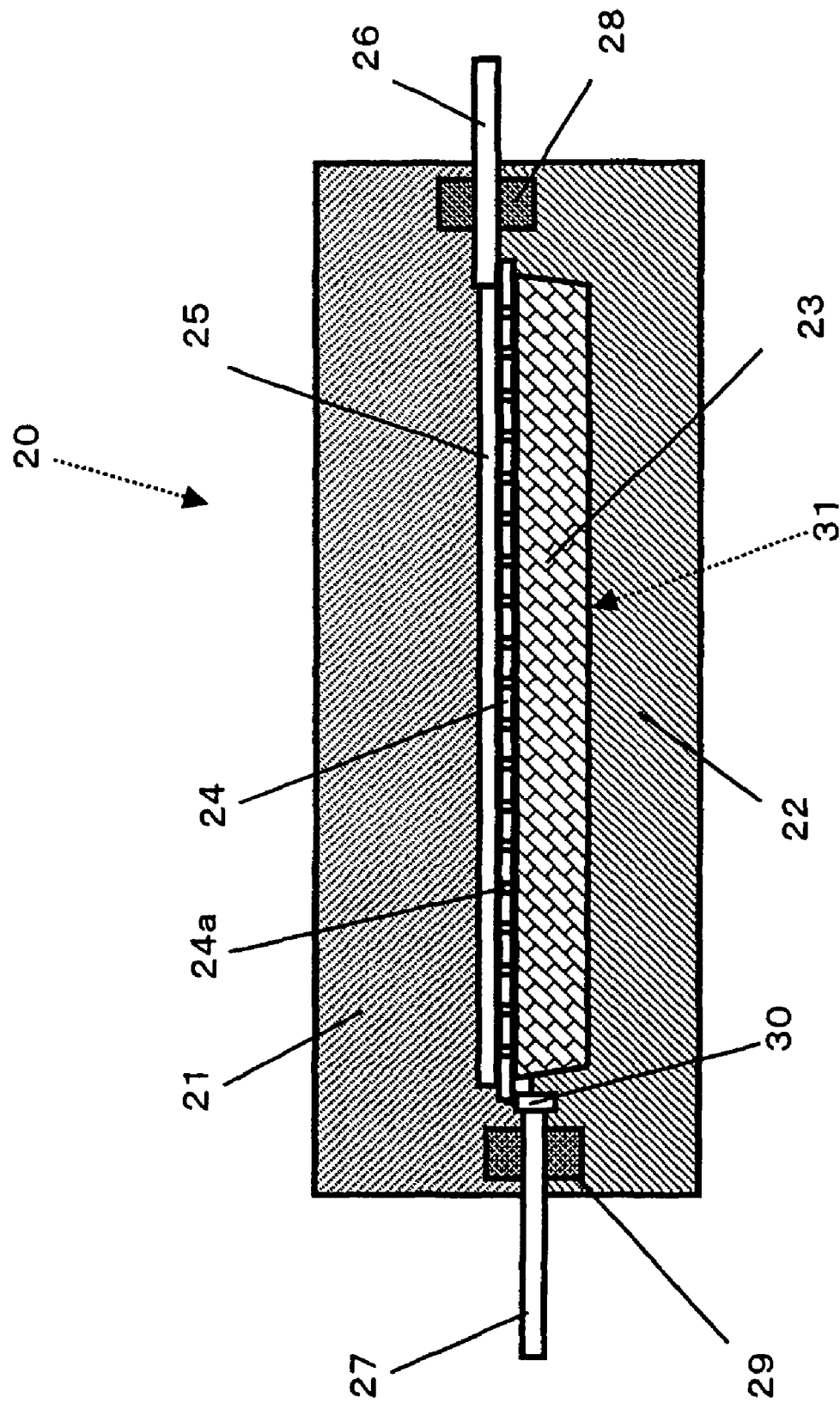

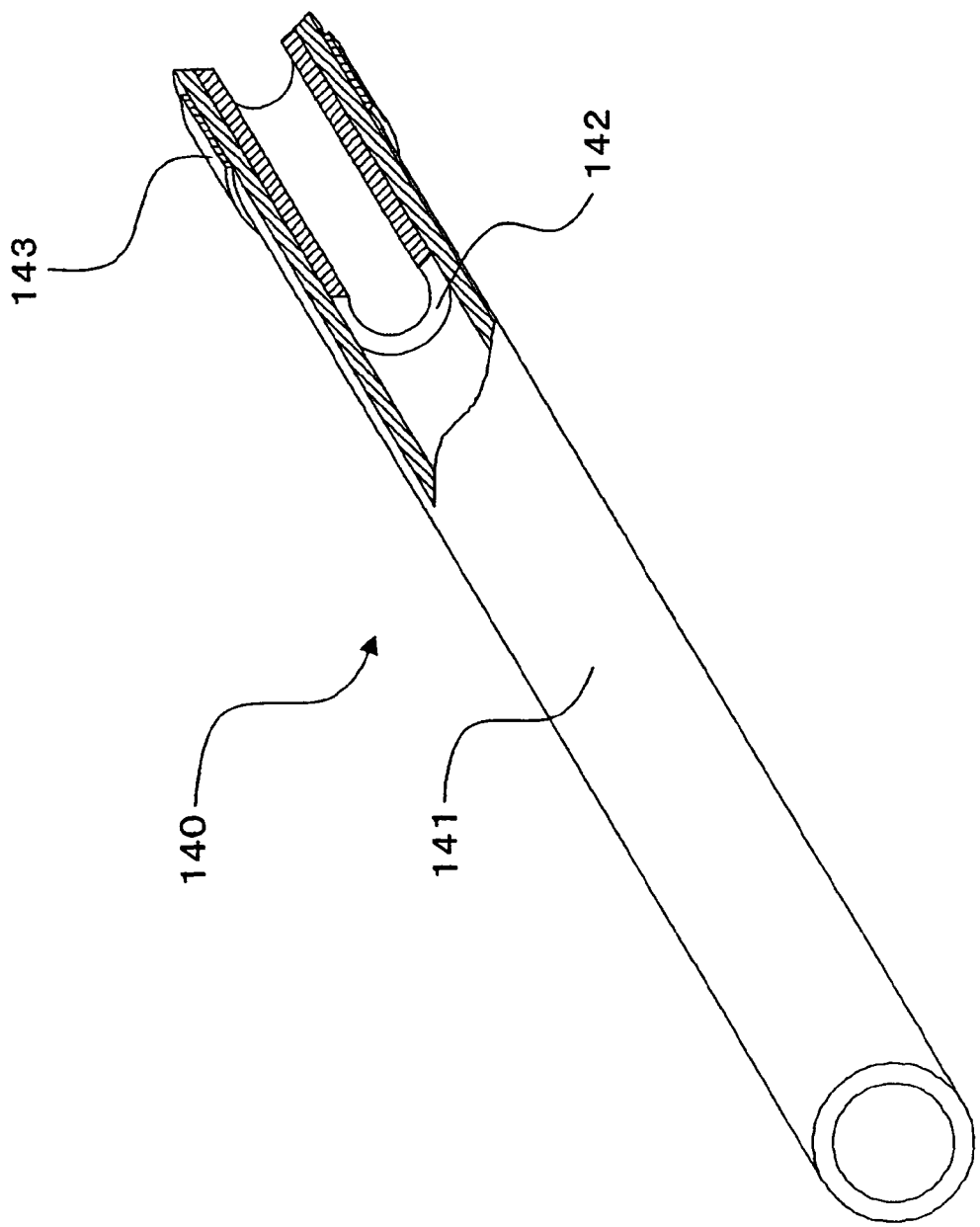

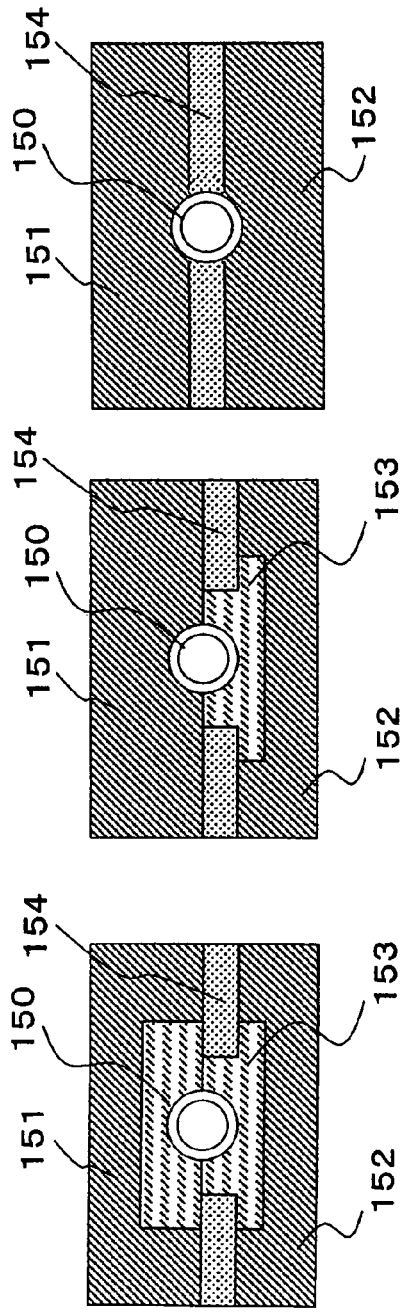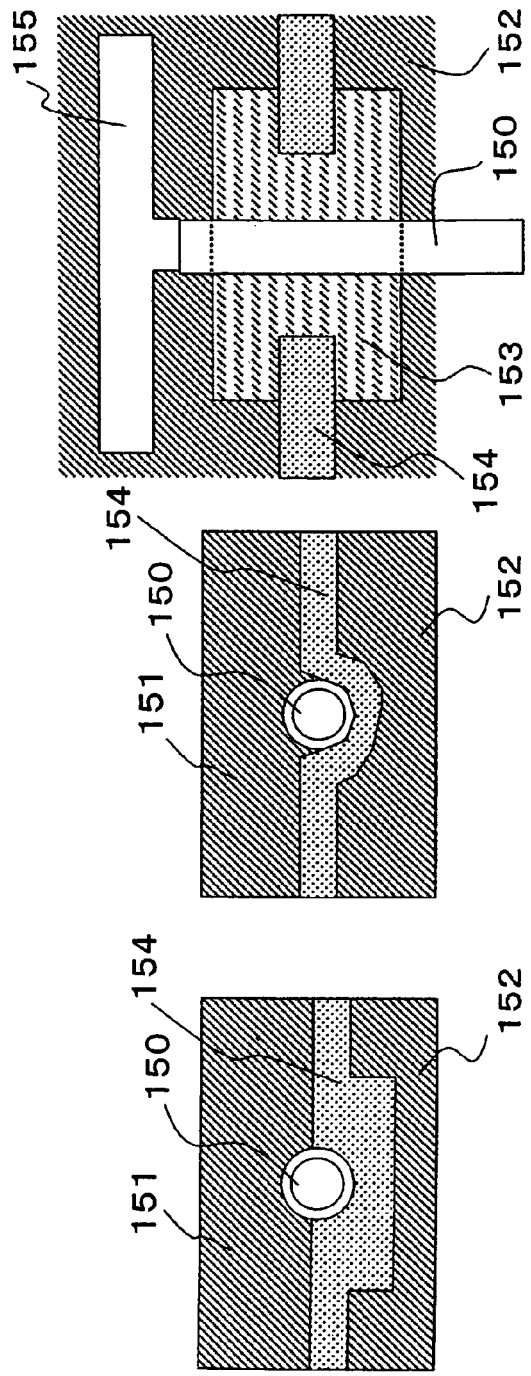

RTM MOLDING METHOD AND DEVICE

TECHNICAL FIELD

This disclosure relates to RTM (Resin transfer Molding) molding method and device for molding a relatively large FRP (Fiber Reinforced Plastic), and more specifically, to RTM molding method and device capable of achieving a high-speed molding and improving a surface quality.

BACKGROUND

FRP, in particular, CFRP (carbon fiber reinforced plastic), is utilized in various fields as a composite material having a property light in weight and high mechanical properties. As one of FRP molding methods, an RTM molding method is known wherein a reinforcing fiber substrate such as a laminated substrate of reinforcing fiber woven fabrics is placed in a mold, and after the mold is clamped, a liquid resin is injected into the mold reduced in pressure, and the resin is heated and cured. Further, in such a conventional molding, it is proposed to give a certain shape to a reinforcing fiber substrate before disposing it in a mold by clamping it with upper and lower preforming dies (for example, JP-A-2003-305719).

In a conventional RTM molding method, generally resin is injected at a pressurized condition from a single injection port. Then, as the case may be, a plurality of resin discharge ports are provided. In such a conventional method, however, there is a problem that RTM molding of a large product is difficult, because it is difficult to set a large amount of flowing resin and there is only one resin injection port. Namely, gelation of resin progresses (resin viscosity increases) during resin flowing, and there occurs a case where the resin does not flow over the entire area of a product to be molded. Further, if the time of gelation is extended by adding a delay agent to the resin, it is possible to flow the resin over the entire area although a long time is required, but too much time is required for achieving a predetermined resin flow, thereby decreasing the production speed and the production amount. Futhermore, when a large product, in particular, a relatively large three-dimensional plane-like product is molded, if resin is flown from a single injection port, in accordance with the shape, there may occur an area where the resin does not flow. Even if the resin flow is controlled by providing a plurality of resin discharge ports, there is a limit for molding a complicated structure properly.

On the other hand, as a method for carrying out resin injection at a time from the entire surface of a product to be molded, there is an RFI (Resin Film Infusion) method. In this method, non-impregnated reinforcing fiber substrate applied with a semi-cured resin film is heated, and molten resin is impregnated by pressing it by hot press and the like, but a complicated-shape molding is difficult, and there is a problem that a non-impregnated portion is liable to occur in a part of the reinforcing fiber substrate.

As a method of impregnation even for a product to be molded which is complicated to some extent and large, there is a method described in JP-A-2002-234078. In this method, a carrier of a matrix resin, for example, prepared by impregnating a molten resin into a sponge material, is used instead of the resin film in the aforementioned RFI method, and although it is an improved method, because a method for covering the entire product to be molded with a bagging film and reducing in pressure the inside thereof is employed as a method for achieving pressure impregnation for a large product in an inexpensive and easy manner, a pressurizing force of only 0.1 MPa can be generated at maximum, and therefore, there are problems that impregnation for a thick product is difficult and that impregnation up to detailed portions is difficult.

Since any of these methods is not a method for impregnating a matrix resin into a reinforcing fiber substrate while flowing the molten resin from initial time, there left a cause for generating non-impregnated portions.

Further, as a conventional RTM molding method, a method is also known wherein resin is injected at a pressurized condition from a single injection line. For example, when a product to be molded has a shape of a polygon (a shape with a plurality of sides), the resin is injected from a certain one side toward another side opposite to the certain one side (for example, JP-A-8-58008 and JP-A-2003-11136). In such a method, however, although the resin surely flows from one side toward the opposite side while the resin is impregnated into a reinforcing fiber substrate in order, if the product to be molded is relatively large, it takes much time to flow the resin, and as the case may be, the resin may reach a time of its gelation during its flow, in such a condition there is a problem that the resin flow stops before complete impregnation. Accordingly, as described in the aforementioned JP-A-8-58008, a method for providing resin injection lines at a plurality of positions of a product to be molded and injecting the resin in order is proposed. In this method, however, since the resin is injected from portions within a molding area of the product to be molded, it cannot be applied to a sandwich molded product using a core material and disposing reinforcing fiber substrates on both surfaces of the core material, because the resin cannot be injected from a mold surface side. Further, even in a case of a non-sandwich molded product, the method cannot be applied to the molding of a product which is double-sided and which requires a high design quality for its surface. Thus, in the above-described conventional RTM molding methods, it is difficult to efficiently mold a relatively large product.

Usually, in an RTM mold consisting of relatively many dies, there is a big problem that the productivity is low, because the molding takes much time. On the other hand, in a structure of a mold consisting of an upper die and a lower die, although it has an advantage that the aforementioned setting of a reinforcing fiber substrate onto the surface of the mold is relatively easy and the setting time is short, in a case of a general resin injection method, that is, in a case where resin is pressurized at a pressure of 0.2 to 1.0 MPa and the resin is injected without a particular control of flow rate, the resin flows into the mold at a flow rate corresponding to the pressure and the resin is charged in the mold in a relatively short period of time, but there may occur a case where the reinforcing fiber substrate is disturbed by the resin flow, or where a non-uniform flow occurs by a high flow rate and many voids and pinholes are generated on the surface of a molded product.

In particular, in a case where resin injection is carried out at a high resin discharge pressure of 0.5 MPa or more (therefore, at a high flow rate) to shorten a molding time or to mold a product having a large area in a short period of time, disturbance of the weave structure of a reinforcing fiber substrate (particularly, a plain weave fabric) is liable to occur, and further, because the resin flows in the mold at a high speed, the resistance against the flow disperses within the flow area depending upon a dimensional unevenness (particularly, an unevenness in thickness) of a cavity in the mold, a fine unevenness in thickness of the substrate, or a difference between partial structures of the substrate due to overlapping of substrate layers and the like, and because a uniform flow cannot be maintained, there is a case where a large void is generated by occurrence of a local forestalling of the resin flow and the like. Furthermore, there is a case where the resin actually flows up to the substrate portion, but, because the flow rate is high, for example, there is no time for release of gas present in the texture of the woven fabric and the gas stays there, and the gas generates a surface defect such as a pinhole. In such conventional molding conditions and molding process causing reduction of quality in appearance concerning the design quality such as substrate disturbance, voids and pinholes, it is difficult to ensure a high surface quality while carrying out a high-speed injection for shortening the molding time. The larger the size of a product to be molded becomes, the more frequently such defects on quality in appearance are liable to occur, because a high-speed resin injection is to be inevitably employed.

Because the flow state of resin greatly influences generation of such voids and pinholes concerning design quality, the density of the reinforcing fiber substrate, that is, the weight thereof, also becomes an important factor. Namely, because a weight of reinforcing fibers per one layer influences a flow resistance of resin and easiness of gas release, it is necessary to set a proper weight in accordance with the resin flow condition. This proper weight has to be set from the viewpoints of not only the surface quality but also the workability and utilization factor in strength of a preform. Namely, if the weight is too great and the rigidity of the substrate becomes high, the reinforcing fiber substrate becomes hard to be situated along the mold surface and hard to be formed in a three-dimensional shape, and there is a case where it takes much working time to make a preform, or that at that time disturbance of the substrate occurs and the mechanical properties of the FRP molded product decrease. Namely, to carry out an efficient production, there is a proper weight corresponding to the production conditions (molding size shape, molding conditions, etc.).

Further, among molding conditions, particularly influence given to a surface quality by temperature and resin injection pressure is great. If a temperature of injected resin itself or a resin temperature heated by a mold is high, the resin viscosity reduces and the flowability of the resin increases, and although the impregnation property of the resin into the substrate is good, the flowability rapidly deteriorates by a high elevation rate of the viscosity, and when the molded product is big, there is a case where the flow of the resin reduces in speed on the way of the molding and it causes a non-impregnated portion. Even if the resin can flow over the entire area, in an area in which the viscosity has become high, there is a case where many voids and pinholes are generated even though non-impregnated portions are not generated. On the other hand, if there is an unevenness of the temperature of a mold or there is a change in the temperature during molding, there is a case where very fine gas bubbles remaining in the mold come into contact with each other and they grow a big bubble developing to a void or a pinhole.

Further, it is important that the pressure is also adequate. Namely, if the pressure is too high, the resin flow rate becomes high, and there is a case where it causes a disturbance of the weave structure of the substrate or it causes an expansion in volume in a cavity to generate bubbles, and if the pressure is too low, there is a case where residual bubbles cannot be compressed to be small.

Further, since a reactive gas may be generated from a reactive resin in its curing process, or fine gas (bubbles) having been contained in a resin may grow to voids or pinholes as the molding time passes, it is better to cure the resin as quickly as possible after the resin is impregnated into the substrate.

The influence given to the yield of the molding by the characteristics of the material of the reactive resin is very high, and for example, depending upon the kind of the curing agent, the reaction speed becomes maximum at an initial period of the reaction of the resin, and thereafter, the time passes. Therefore, the reaction speed reduces, and there is a case where the time required for the curing becomes long. On the contrary, if the curing time is to be shortened by elevating the temperature of the mold, there is a case where the initial viscosity increases too much, the viscosity is elevated too much at the time of resin injection and flow, ultimately the resin is gelated, and the molding is stopped on the way and a non-impregnated portion is generated.

Thus, in FRP molding (particularly, RTM molding), there exist proper molding conditions and material characteristic in accordance with molding size (area), and if not molded at proper conditions, problems on quality, in particular, on surface quality, are liable to occur.

Further, to improve the surface quality of a molded product as one of the purposes, a method is proposed wherein a reinforcing fiber substrate is given with a certain shape before it is disposed in a mold, by nipping it with upper and lower dies for preforming prior to RTM molding, and only the reinforcing fiber substrate preformed is disposed directly on the molding surface (for example, the aforementioned JP-A-2003-305719).

In such a conventional molding method, however, if a resin to be injected and cured is not delivered enough and is not impregnated into the details of the reinforcing fiber substrate, voids and pinholes may occur, and the mechanical properties of the molded product may be decreased, or the surface quality may be reduced. Especially, if voids or pinholes appear on the surface, in particular, on the design surface side, although usually patching such as charge of resin is carried out, this patching requires work and time, and decreases the efficiency of the whole of the manufacturing process.

As the countermeasure for preventing occurrence of such voids and pinholes injuring the design quality of the design surface, there is a case where a random mat layer is provided on the upper surface of a surface-layer substrate. This random mat layer is called as "a surface mat" because the random mat layer becomes an outermost layer, and particularly in a prepreg/autoclave curing method, an RFI (Resin Film Infusion) method, a hand-lay-up method, etc., it is sometimes employed. However, the structure thereof is a substrate structure in which the surface substrate and the random mat layer are completely replaced with each other, as compared the embodiment described later.

In a case where such a substrate structure is employed in a molding method such as RTM molding and vacuum molding wherein a resin fluid is injected into a dry substrate and flown and impregnated into the substrate, it is necessary to discharge also bubbles by the flow of the resin, and at a portion with a low resin flowability, voids are liable to be generated or pinholes are liable to occur by the left bubbles.

In a case where an FRP is molded by an RTM molding method or a vacuum molding method by using the above-described random mat as a surface mat and disposing it as an outermost layer, the random mat in a state of a dry substrate is pressed to the mold surface, and a gap between the mold surface and the random mat is very small because the bulkiness of the random mat with a low weight is low. Therefore, the resin flowability into the gap is poor, and as a result, voids and pinholes are liable to occur at the position thereof. Thus, particularly in an RTM molding method and a vacuum molding method, even if a random mat layer is provided as an outermost layer (a surface layer at a design surface), occurrence of voids and pinholes cannot be prevented.

Accordingly, paying attention to the above-described situations, it could be helpful to provide an RTM molding method and device wherein, even as for a relatively large three-dimensional configuration, the molding process from resin injection to impregnation and curing can be carried out at a high speed as compared with conventional RTM molding method and device, without generating non-resin-flowing areas, thereby achieving shortening of the molding time, increase of production speed and production amount, in particular, increase of production amount per one mold, and reducing the production cost.

Further, it could be helpful to provide an RTM molding method and device wherein, in an RTM molding for molding a relatively large fiber reinforced plastic product with a projection area of substantially 1 $m^2$ or more, a voidless high-quality product can be molded efficiently in a short period of time.

Furthermore, it could be helpful to provide an RTM molding method wherein injected resin can be surely and easily delivered over the entire range of a desirable area in the resin injection step, and a fiber reinforced plastic with an improved surface quality can be produced by preventing occurrence of voids and pinholes on a surface, in particular, on the design surface side.

SUMMARY

We provide an RTM molding method comprising the steps of disposing a reinforcing fiber substrate in a cavity of a mold consisting of a plurality of dies, clamping the mold, and thereafter injecting resin to complete molding, and characterized in that divided areas with respect to a surface direction of the reinforcing fiber substrate are assumed, each divided area is one in which injected resin expands over the entire surface in each divided area and can be substantially uniformly impregnated in a thickness direction of the substrate, and resin introducing paths are formed for respective assumed divided areas for introducing the injected resin into the respective divided areas. In this RTM molding method, vacuum suction may be carried out from a resin discharge line for a predetermined period of time of at least from a time after clamping the mold to a time starting resin injection.

Further, we provide an RTM molding device for disposing a reinforcing fiber substrate in a cavity of a mold consisting of a plurality of dies, clamping the mold, and thereafter injecting resin to complete molding, is characterized in that divided areas with respect to a surface direction of the reinforcing fiber substrate are assumed, each divided area is one in which injected resin expands over the entire surface in each divided area and can be substantially uniformly impregnated in a thickness direction of the substrate, and resin introducing paths are formed for respective assumed divided areas for introducing the injected resin into the respective divided areas. In this RTM molding device, the device may have means for carrying out vacuum suction from a resin discharge line for a predetermined period of time of at least from a time after clamping the mold to a time starting resin injection.

In the above-described RTM molding method and device, for a reinforcing fiber substrate with a relatively large area, adequate divided areas are assumed, resin introducing paths are formed for respective assumed divided areas for introducing the injected resin into the respective divided areas, and by injecting the resin via the resin introducing paths, as the result, the resin is impregnated quickly and uniformly over the entire range of the reinforcing fiber substrate. The number of division of the divided areas may be a countable number as shown in the first and second embodiments described later, or may be substantially innumerable number as shown in the third embodiment described later.

Then, we provide an RTM molding method wherein an intermediate member having resin paths extending through the intermediate member in its thickness direction is disposed between dies forming the mold, and resin is injected to the reinforcing fiber substrate from a plurality of positions via the intermediate member almost simultaneously (method according to a first embodiment).

Further, we provide an RTM molding device wherein an intermediate member having resin paths extending through the intermediate member in its thickness direction is disposed between dies forming the mold for injecting resin to the reinforcing fiber substrate from a plurality of positions via the resin paths almost simultaneously (device according to a first embodiment).

In the RTM molding method and device according to the first embodiment, a structure may be employed wherein a groove for discharging resin, which extends substantially over the entire circumference of the reinforcing fiber substrate, is formed on any one of the dies. Further, a structure may also be employed wherein a groove for discharging resin, which extends substantially over the entire circumference of the reinforcing fiber substrate, is formed on the above-described intermediate member.

The above-described intermediate member may be structured to be provided with grooves for resin paths formed on its one surface and through holes communicating with the grooves and extending to its reinforcing fiber substrate disposed-side surface opposite to the above-described one surface through the intermediate member.

The above-described intermediate member can be made from either a metal or a resin. Further, a structure can be employed wherein a member for resin injection (for example, a pipe for resin injection) is nipped and sealed by the intermediate member and a die facing the intermediate member. Further, a structure can also be employed wherein a member for resin discharge (for example, a pipe for resin discharge) is nipped and sealed by the intermediate member and a die facing the intermediate member via the reinforcing fiber substrate.

As the above-described intermediate member, a perforated plate or resin film provided with a plurality of through holes can be used. In this case, a structure can be employed wherein a groove for a resin path is provided on a die facing the intermediate member. Further, a structure can also be employed wherein a gap is formed between the intermediate member and a die facing the intermediate member, and the gap is set in a range of 1 to 10 mm.

Further, a structure can be employed wherein a core material is laminated to the reinforcing fiber substrate, and typically, a sandwich structure can be employed wherein a core material is nipped with reinforcing fiber substrates from both sides.

Further, to improve the sealability at a position of parting surfaces of dies of the mold, particularly, to improve the sealability at a resin injection or discharge portion to shorten the cycle time of the RTM molding, a structure can be employed wherein a tube for resin injection and/or a tube for resin discharge is provided being nipped between parting surfaces of dies, and portions between the tube and the dies are sealed with an elastic material (an elastic material for seal).

In the above-described structure for improvement of sealability, a structure can be employed wherein an end portion of an O-ring for sealing the cavity of the mold at positions of parting surfaces of dies is incorporated into the elastic material for seal.

Further, to discharge bubbles due to evaporation of gas dissolved in the resin which is generated during resin injection or residual fine bubbles in corner portions of the mold, a structure can be employed wherein, while the resin is injected into the mold at a pressurized condition, gas and excessive resin in the mold are discharged intermittently.

In this structure, when a resin pressure in the mold of resin pressurized and injected is referred to as Pm and a resin discharge pressure at an injection port for injecting resin is referred to as Pi, a flow rate of resin flowing into the mold can be controlled by selective control between conditions of Pm=Pi and Pm<Pi. Further, the flow rate of resin flowing into the mold can also be controlled by adjustment of a diameter of a discharge port for discharging resin. The adjustment of the diameter of the discharge port and a timing for the adjustment may be stored in memory, and based on the stored information, the flow rate of resin flowing into the mold may be automatically controlled.

Further, a structure can be employed wherein, when resin is injected into the cavity of the mold at a pressurized condition, a ratio of a flow rate of the resin per a unit time (Q: cc/min.) to a projected area of the cavity (S: $m^2$) (Q/S: cc/min.·$m^2$) is in a range of 50<Q/S<600.

In this case, a structure can also be employed wherein the product of the ratio (Q/S: cc/min.·$m^2$) and a pressurizing force of resin (P: MPa) ((Q/S)xP: ccMPa/min.·$m^2$) is in a range of 20≦(Q/S)xP≦400.

Further, a structure wherein a pressurizing force of the resin is in a range of 0.2 to 0.8 MPa, and a structure wherein the resin is cured for 3 to 30 minutes at a constant heating temperature in a range of 60 to 160° C., can be employed.

The above-described RIM molding method and device according to the first embodiment employ the following basic concept. Namely, any way, the number of the resin injection ports is increased, and a resin flowing region per one injection port is made small. Then, before the resin is impregnated into the reinforcing fiber substrate, the resin is once flown on the surface of the substrate and stored there, and a pressure is applied to the resin and the resin is flown and impregnated at a time over the entire area. At that time, the substantial resin flow is controlled at a range corresponding to the thickness of the substrate. Namely, the resin is flown in a surface direction over a sufficiently wide area beforehand, and from there, the resin is flown and impregnated at a time in the thickness direction of the substrate. Therefore, the resin is injected into the substrate from the entire area (not from the circumference), and the resin is impregnated into the substrate very quickly. The resin discharge is preferably carried out from the circumference (as the case may be, from the entire circumference).

To carry out such a resin flow operation, in the above-described RTM molding method and device, an intermediate member forming resin paths (for example, an intermediate plate for resin injection multi-port) is disposed between dies, for example, between one-side die (for example, an upper die) and the other-side die (for example, a lower die), and the resin is injected to the reinforcing fiber substrate from a plurality of positions via the intermediate member almost simultaneously. For example, the resin is flown to the reinforcing fiber substrate almost simultaneously from a plurality of injection ports provided on the intermediate member, and the resin is flown almost uniformly over the entire area of the substrate.

Further, a structure may also be employed wherein an intermediate plate with a small opening area for injection (such as a perforated plate or a perforated film having a great resistance against resin flow) is provided as the intermediate member between the reinforcing fiber substrate and the upper die (one-side die), a fine gap (for example, a gap in the above-described range of 1 to 10 mm) is maintained between the intermediate plate and the upper die, and the resin is flown into the gap. Because of the small flow resistance, before the resin flows from the holes of the intermediate plate, the resin expands over a sufficiently wide area, the resin is stored, and the resin is injected in the direction toward the reinforcing fiber substrate through the through holes substantially at a time. Therefore, even in this case, the resin can be injected from a plurality of positions almost simultaneously and uniformly.

Further, we provide an RTM molding method wherein, after resin is impregnated into the reinforcing fiber substrate by injecting the resin from a resin injection line toward a resin discharge line, which are disposed on an outer circumference of the cavity, the resin is heated and cured, and the resin injection line is divided into a plurality of parts (method according to a second embodiment).

Further, we provide an RTM molding device wherein, after resin is impregnated into the reinforcing fiber substrate by injecting the resin from a resin injection line toward a resin discharge line, which are disposed on an outer circumference of the cavity, the resin is heated and cured, and the resin injection line is divided into a plurality of parts (device according to a second embodiment).

In the RTM molding method and device according to the second embodiment, it is preferred that the above-described resin injection line and resin discharge line are formed substantially over the entire range of the outer circumference of the cavity. Further, it is preferred that, with respect to the above-described resin injection line and resin discharge line, the length of the resin injection line is two times or more the length of the resin discharge line.

Such a resin injection line and/or such a resin discharge line can be formed from a groove processed on the mold. In a case where the mold comprises an upper die and a lower die, it is preferred that the groove is all processed on the lower die.

Further, the resin discharge line can be also divided into a plurality of parts.

It is preferred that resin injection from the resin injection line divided into a plurality of parts is carried out in order from a resin injection line part which is substantially more distant from the resin discharge line. Further, resin injection can be carried out also from the resin discharge line by switching the resin discharge line to a resin injection line after a predetermined period of time.

Further, also in the RTM molding method and device according to the second embodiment, a structure can be employed wherein a core material is laminated to the reinforcing fiber substrate, and typically, a sandwich structure can be employed wherein a core material is nipped with reinforcing fiber substrates from both sides.

Further, to improve the sealability at a position of parting surfaces of dies of the mold, particularly, to improve the sealability at a resin injection or discharge portion to shorten the cycle time of the RTM molding, a structure can be employed wherein a tube for resin injection and/or a tube for resin discharge is provided being nipped between parting surfaces of dies, and portions between the tube and the dies are sealed with an elastic material (an elastic material for seal).

In the above-described structure for improvement of sealability, a structure can be employed wherein an end portion of an O-ring for sealing the cavity of the mold at positions of parting surfaces of dies is incorporated into the elastic material for seal.

Further, to discharge bubbles due to evaporation of gas dissolved in the resin which is generated during resin injection or residual fine bubbles in corner portions of the mold, a structure can be employed wherein, while the resin is injected into the mold at a pressurized condition, gas and excessive resin in the mold are discharged intermittently.

In this structure, when a resin pressure in the mold of resin pressurized and injected is referred to as Pm and a resin discharge pressure at an injection port for injecting resin is referred to as Pi, a flow rate of resin flowing into the mold can be controlled by selective control between conditions of Pm=Pi and Pm<Pi. Further, the flow rate of resin flowing into the mold can also be controlled by adjustment of a diameter of a discharge port for discharging resin. The adjustment of the diameter of the discharge port and a timing for the adjustment may be stored in memory, and based on the stored information, the flow rate of resin flowing into the mold may be automatically controlled.

Further, a structure can be employed wherein, when resin is injected into the cavity of the mold at a pressurized condition, a ratio of a flow rate of the resin per a unit time (Q: cc/min.) to a projected area of the cavity (S: $m^2$) (Q/S: cc/min.·$m^2$) is in a range of 50<Q/S<600.

In this case, a structure can also be employed wherein the product of the ratio (Q/S: cc/min.·$m^2$) and a pressurizing force of resin (P: MPa) ((Q/S)xP: ccMPa/min.·$m^2$) is in a range of 20≦(Q/S)xP ≦400.

Further, a structure wherein a pressurizing force of the resin is in a range of 0.2 to 0.8 MPa, and a structure wherein the resin is cured for 3 to 30 minutes at a constant heating temperature in a range of 60 to 160° C., can be employed.

Further, to achieve the aforementioned third object, we provide an RTM molding method wherein at least one surface layer of the reinforcing fiber substrate comprises a continuous fiber layer, and a layer positioned immediately under the surface layer comprises a random mat layer (method according to a third embodiment).

Since the random mat layer is random in fiber orientation and low in weight, the resistance against resin flow is low, and by providing this random mat layer, it becomes possible to form a resin flow path in which resin can flow relatively easily. By disposing this random mat layer immediately under the surface layer of the continuous fiber substrate which is at least one surface layer, when resin is injected, a good resin flow can be formed near the surface layer, in particular, in a direction along the surface of the surface layer, and a portion improper in resin impregnation, which may become void, can be prevented from being generated, thereby improving the surface of the molded product.

In the RTM molding method according to this third embodiment, it is preferred that the surface layer is formed from three or less continuous fiber layers. If the continuous fiber substrate is too thick, because there is a fear that resin is hard to reach the random mat layer through the substrate, or that the resin having flown well in the random mat layer is hard to be impregnated into the continuous fiber substrate of the surface layer, the lamination form of the continuous fiber substrate of the surface layer is preferably a form of three or less layers.

Further, it is preferred that the total weight of the continuous fiber layer forming the surface layer is 700 g/$m^2$ or less, and from the viewpoint of surface design quality, preferably it is formed as a woven fabric with a weave structure such as a plain weave, a twill weave or satin weave. Further, although bubbles causing pinholes are likely to stay in the weave textures of these woven fabrics, as described above, occurrence of pinholes can be prevented by disposing a random mat layer immediately under the surface substrate and discharging bubbles. This surface layer can be made of, for example, a carbon fiber woven fabric. As the reinforcing fibers, carbon fibers, glass fibers, aramide fibers, metal fibers, boron fibers, alumina fibers, silicon carbide high-strength synthetic fibers, etc. can be used, and in particular, carbon fibers and glass fibers are preferred. Among these, it is preferred that the reinforcing fibers of the above-described surface layer are formed as a carbon fiber woven fabric.

As the total weight of the above-described random mat layer, because the random mat layer is disposed mainly for the purpose of forming a resin flow path with a small resistance at the time of resin flow and resin impregnation, the total weight is preferably 150 g/$m^2$ or less which is lower than that of the surface substrate or the reinforcing fiber substrate. This random mat layer contributes to improve the surface quality by decreasing the flow resistance of matrix resin lower than that of the reinforcing fiber layer and greatly improving the flowability and the impregnation property of the resin, thereby preventing occurrence of voids and pinholes. Therefore, as long as this purpose can be achieved, it is not preferred that the random mat layer, which almost does not function as reinforcing fibers, is too much, from the viewpoint of maintaining the mechanical properties of FRP such as strength and rigidity, and as described above, it is preferred that the total weight is 150 g/$m^2$ or less.

Further, although carbon fibers or aramide fibers may be used for the random mat layer, glass fibers that are relatively cheap can be used for this layer, and the glass fibers are more preferable.

Further, also in the RTM molding method according to this third embodiment, a structure can be employed wherein a core material is laminated to the reinforcing fiber substrate, and typically, a sandwich structure can be employed wherein a core material is nipped with reinforcing fiber substrates from both sides.

By such an RTM molding method according to this third embodiment, the injected resin can be easily and surely delivered over the entire range of a desirable area in the resin injection step, voids and pinholes can be prevented from being generated on the surface, in particular, on the design surface side, thereby obtaining a fiber reinforced resin with an improved surface quality. This RTM molding method according to the third embodiment can be used by combining with the RTM molding method according to the aforementioned second embodiment, and in such a case, the advantage due to the random mat layer can be exhibited better.

In the RTM molding method and device, since adequate divided areas are assumed and the injected resin can be delivered enough to the respective divided areas and can be impregnated well into the respective divided areas even if a reinforcing fiber substrate with a relatively large area is used, the molding process from resin injection to impregnation and curing can be carried out at a high speed without generating non-resin-flowing areas, thereby achieving shortening of the molding time and increase of production speed and production amount, and reducing the production cost. Further, the resin can be impregnated at a desirable state over the entire area, thereby improving the surface quality of the molded product.

In particular, in the RTM molding method and device according to the first embodiment, since the resin is flown in advance so as to be spread to a sufficiently wide area via the intermediate member and thereafter the resin is injected into the reinforcing fiber substrate from a plurality of positions almost simultaneously and uniformly, even as for a relatively large three-dimensional configuration, the molding can be carried out at a high speed without generating non-resin-flowing areas. As a result, the molding time is greatly shortened, it becomes possible to increase the production speed and the production amount, and it becomes possible to reduce the production cost by increasing the production amount per one mold. Further, even as for a large-sized product to be molded, it becomes possible to easily prevent generation of resin non-impregnated portions, thereby improving the quality of the molded product.

Further, in the RTM molding method and device according to the second embodiment, a relatively large FRP product can be molded efficiently and stably in a short period of time without occurrence of defects such as voids, which has been difficult by a conventional RTM molding method. Namely, mass production with a high-cycle becomes possible.

Furthermore, in the RTM molding method according to the third embodiment, by disposing the random mat layer with a weight lower than that of the layer of surface layer or the layer of the reinforcing fiber substrate immediately under the continuous fiber substrate of at least one surface layer, when the resin is injected and impregnated into the reinforcing fiber substrate, resin flow paths with a small flow resistance and easy to flow resin are formed, and the injected resin is well delivered up to the detailed portions because the fiber orientation is random, thereby preventing occurrence of defects such as voids and pinholes ascribed to resin non-impregnated portions. In particular, by a condition where the random mat layer is disposed immediately under the surface layer, it can be efficiently prevented that such defects are generated on the surface of the molded product, and the surface quality of the molded product, particularly, the quality of the design surface, can be effectively improved.

BRIEF DESCRIPTION OF THE DRAWINGS

FIG. 5 is a sectional view of a device used in an RTM molding method according to another embodiment different from the first embodiment.

FIG. 22 is a perspective view of a tube portion for resin injection discharge used for parting surfaces of dies of a mold.

FIGS. 23A to 23F are schematic diagrams showing various examples of sealing forms for tube portions for resin injection discharge disposed on parting surfaces of dies of molds.

Figure 1:
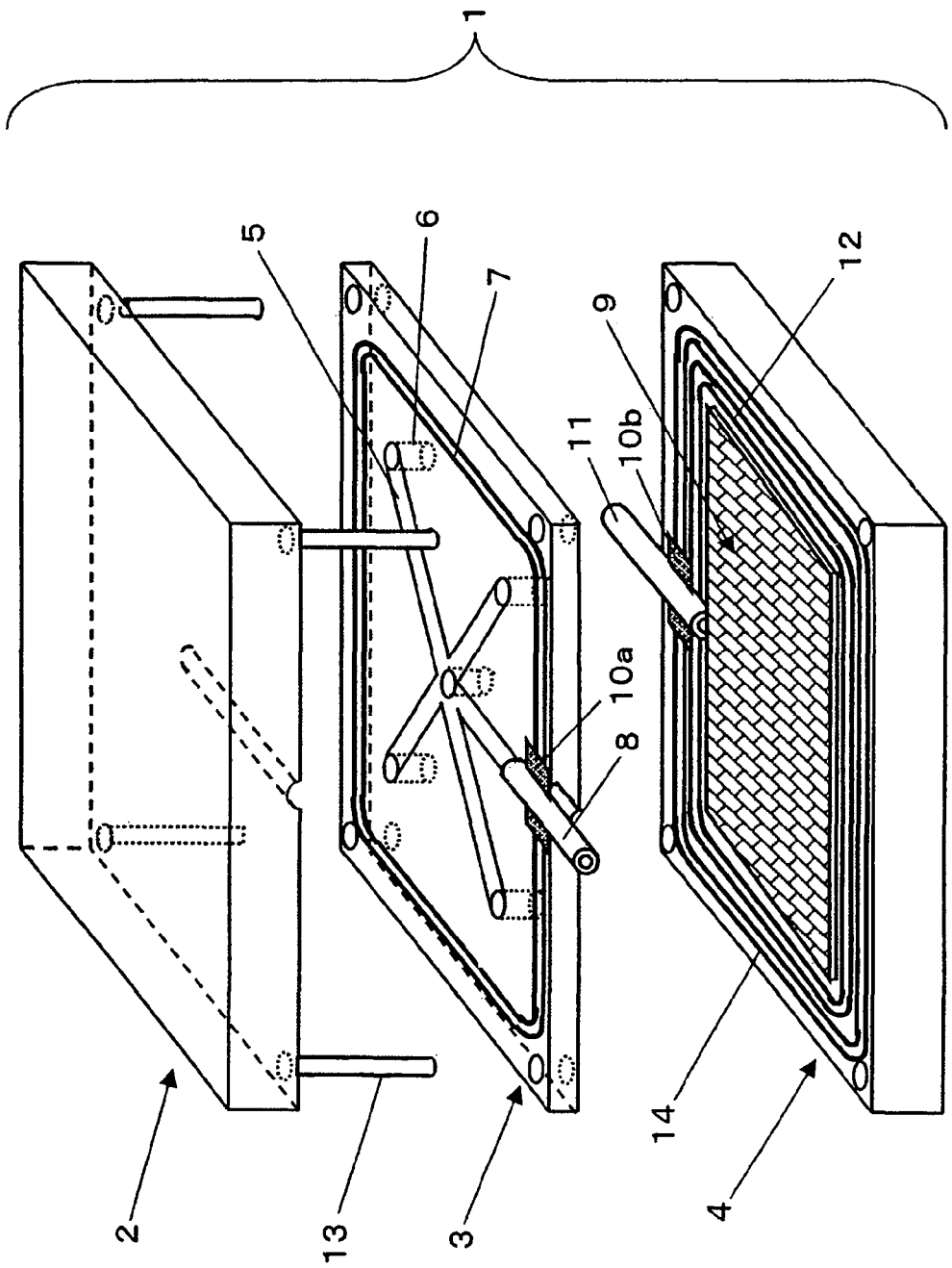
FIG. 1 is an exploded perspective view of a device used in an RTM molding method according to a first embodiment.

EXPLANATION OF SYMBOLS 1, 20: mold
2, 21: upper die
3, 24: intermediate member
4, 22: lower die
5: groove for resin injection path
6, 24a: through hole
8, 26: resin injection member
9, 23: reinforcing fiber substrate
11, 27: resin discharge member
25: gap (clearance)
41: RTM mold
42: upper die
43: lower die
44: preform substrate (reinforcing fiber substrate)
45: mold sealing material
46, 47, 48: resin injection tube
46a, 47a, 48a: rubber member for seal
46b, 47b, 48b: resin injection valve
46c, 47c, 48c: resin injection runner
46d, 47d, 48d: resin injection film gate
49: resin discharge tube
49a: rubber member for seal
49b: resin discharge valve
49c: resin discharge runner
49d: resin discharge film gate
50: cavity
51: hole for pin
52: pin
54: RTM molding system
55: mold lifting device 56: hydraulic device for mold lifting
57: resin injection device
58: vacuum pump
59: resin trap
60: temperature controller
61a: main ingredient tank
61b: curing agent tank
62: pressurization device
63: mixing unit
64: divergent tube
65: resin injection path
66: hydraulic cylinder
67: discharge path
68: hydraulic pump
71, 76, 100: fiber reinforced resin
72, 72a, 72b: surface layer substrate
73, 73a, 73b: random mat layer
74, 74a, 74b: reinforcing fiber substrate forming a reinforcing layer
75a, 75b, 75c, 75d: stream line of resin flow
75, 77a, 77b: resin
78, 79, 82: bubble
83: upper die
84: lower die
85: resin injection port
86: suction port
87: preform substrate
88: runner for resin injection
89: runner for suction
90: seal groove
91: resin tank
92, 95: valve
93: resin injection route
94: vacuum pump
96: suction route
97: molded product
101: core material
111, 131, 151: upper die
112, 132, 152: lower die
113, 133: cavity
114, 138 runner for resin injection
115, 139: runner for resin discharge
116, 134: tube for resin injection
117, 135: tube for resin discharge
118, 119, 136, 137, 153: elastic material for seal
121, 154: O-ring
122: reinforcing fiber substrate
123: reinforcing fiber preform material
124: core material
125: reinforcing fiber substrate
126, 127: gate

DETAILED DESCRIPTION

Hereinafter, desirable embodiments will be explained referring to figures.

First, as the reinforcing fibers, carbon fibers, glass fibers, aramide fibers, metal fibers, boron fibers, alumina fibers, silicon carbide high-strength synthetic fibers, etc. can be used, and particularly carbon fibers are preferable. The form of the reinforcing fiber substrate is not particularly limited, a unidirectional sheet or a woven fabric can be employed, usually a plurality of these are stacked to form a reinforcing fiber substrate, and it is used as a formation of a preform given with a predetermined form beforehand in accordance with requirements.

As the resin used in the RTM molding method and device, a thermosetting resin, which is low in viscosity and easy to be impregnated into reinforcing fibers, or a monomer for RIM (Resin Injection Molding) forming a thermoplastic resin, etc., is suitable. As the thermosetting resin, for example, an epoxy resin, an unsaturated polyester resin, a polyvinylester resin, a phenolic resin, a guanamine resin, a polyimide resin such as bismaleimide triazine resin, a furan resin, a polyurethane resin, a polydiarylphthalate resin, further, a melamine resin, a urea resin, an amino resin, etc. can be raised.

Further, a polyamide such as nylon 6, nylon 66 or nylon 11, or a copolymerized polyamide of these polyamides, a polyester such as polyethylene terephthalate or polybutylene terephthalate, or a copolymerized polyester of these polyesters, further, a polycarbonate, a polyamideimide, a polyphenylene sulfide, a polyphenylene oxide, a polysulfone, a polyethersulfone, a polyetheretherketone, a polyetherimide, a polyolefine, etc., and furthermore, a thermoplastic elastomer represented by a polyester elastomer, polyamide elastomer, etc. can be raised.

Further, a resin prepared by blending a plurality of components selected from the group of the above-described thermosetting resins, thermoplastic resins and rubbers also can be used.

As a preferable resin, an epoxy resin can be raised, from the viewpoint of suppressing a thermal shrinkage at the time of molding which influences a design quality of an outer panel for vehicles.

In a general epoxy resin for a composite material, as its main ingredient, bisphenol A-type epoxy resin, phenol novolak-type epoxy resin or glycidyl amine-type epoxy resin is used. On the other hand, as the curing agent, a curing agent prepared by combining dicyanediamide with dichlorophenyldimethyl urea is suitably used from the viewpoint of its good balance between workability and properties. However, it is not particularly limited, and diaminophenylsulfone, aromatic diamine, acid anhydride polyamide, etc. also can be used. Further, the ratio of the resin to the above-described reinforcing fibers is preferably in a range of 20:80 to 70:30 in weight ratio, from the viewpoint of maintaining an appropriate rigidity as an outer panel. In particular, an epoxy resin or a modified epoxy resin compounded with a thermoplastic resin, a rubber component, etc., a nylon resin, or a dicyclopentadiene, is more suitable, from the viewpoint of decreasing thermal shrinkage of an FRP structural material and suppressing occurrence of cracks.

Further, this disclosure can be applied to molding of a fiber reinforced resin structural material having a lamination structure of a fiber reinforced resin and a core material. For example, a sandwich structure in which fiber reinforced resin layers are disposed on both sides of a core material can be raised. It is possible to use an elastic material, a foamed material or a honeycomb material as the core material, and a foamed material and a honeycomb material are preferable for lightening in weight. The kind of the foamed material is not particularly limited, and for example, a foamed material of a polymer such as polyurethane, acrylic, polystyrene, polyimide, vinyl chloride or phenol can be used. The material of the honeycomb material is not particularly limited, and for example, an aluminum alloy, a paper, an aramide paper, etc. can be used.

FIGS. 1 to 4 show RTM molding method and device according to a first embodiment. In FIG. 1, a mold 1 comprises a plurality of dies, and in this embodiment, it has an upper die 2 made of a steel as a one-side die and a lower die 4 made of the same material as the other-side die and has an intermediate plate 3 made of a resin (for example, polyethylene) as an intermediate member. Resin injection paths and injection ports are formed by these upper die 2 and intermediate plate 3. Grooves 5 for resin injection path, which communicate with a resin injection member 8, are processed on intermediate plate 3, and a through hole 6 for injection port is processed at an end portion of each groove 6. The resin injection member 8 is formed from a metal pipe of a resin tube, and it is sealed relative to a metal die forming upper die 2 and intermediate plate 3 by a seal material 10a made of an elastic material such as a rubber. The circumference of upper die 2 and intermediate plate 3 is sealed by an O-ring 7, and the O-ring 7 is combined with seal material 10a. On four corners of upper die 2, guides 13 are provided for connecting the upper die 2 to intermediate plate 3 and lower die 4.

A reinforcing fiber substrate 9 is disposed on the cavity portion of lower die 4, and a groove 12 (runner) for resin discharge is processed on the outer circumference side of the substrate 9. An excessive resin is discharged to outside of the mold from a resin discharge tube 11 inserted into a part of groove 12. An O-ring 14 for seal is disposed on the circumference of the groove 12, and the O-ring 14 is combined with a seal material 10b made of an elastic material and the like and provided for sealing between tube 11 and die 4.

Figure 2A:
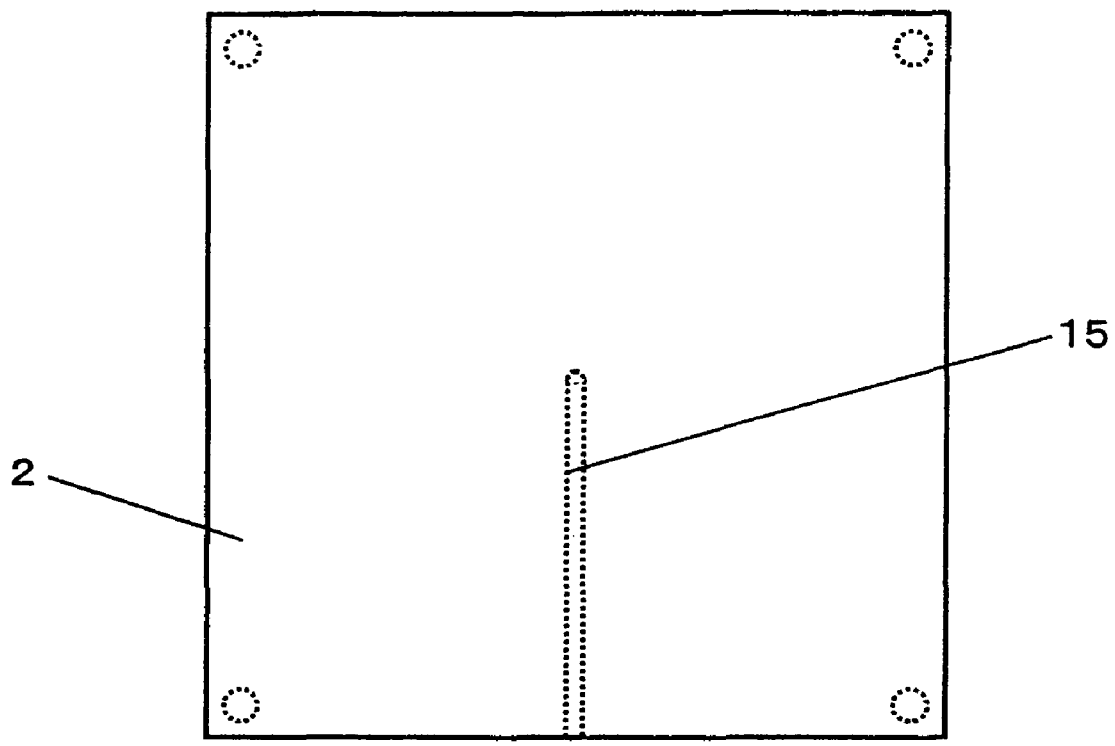
FIG. 2A is a plan view of an upper die of the device depicted in FIG. 1.
Figure 2B:
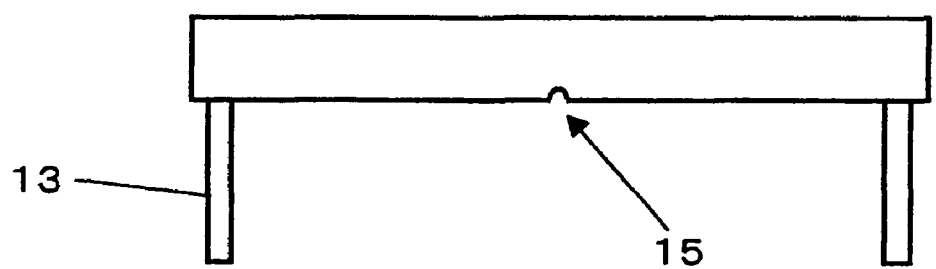
FIG. 2B is an elevational view thereof.

FIG. 2 shows upper die 2, FIG. 2A is a plan view thereof, and FIG. 2B is an elevational view thereof. A resin injection path 15 is formed on upper die 2, and the upper half of resin injection member 8 is stored in the entrance of the path 15.

Figure 3A:
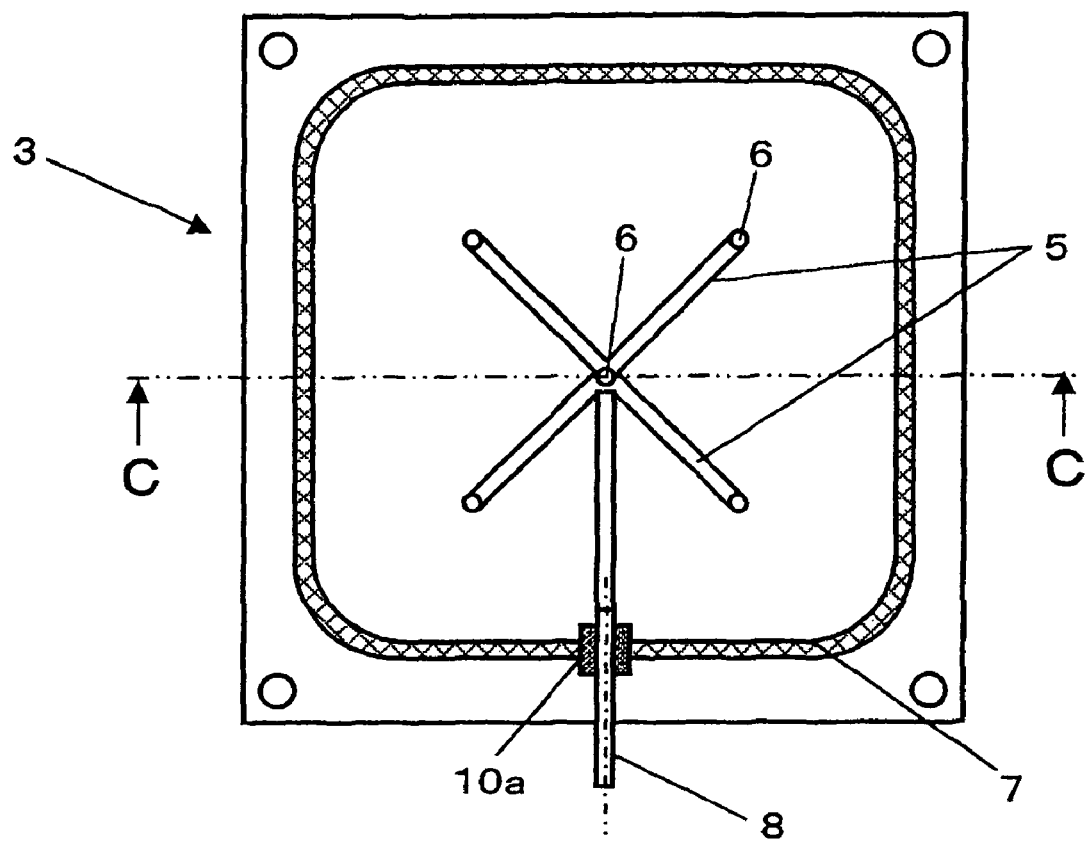
FIG. 3A is a plan view of an intermediate member of the device depicted in FIG. 1.
Figure 3B:
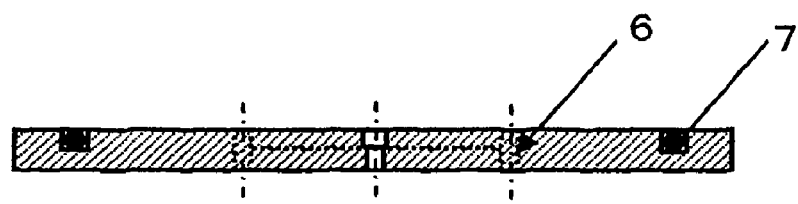
FIG. 3B is a sectional view as viewed along the line C-C of FIG. 3A.

FIG. 3 shows intermediate plate 3, FIG. 3A is a plan view thereof, and FIG. 3B is a sectional view thereof as viewed along line C-C of FIG. 3A. The dimension of intermediate plate 3 in this example is 1800 mm in width, 2000 mm in length and 12 mm in thickness. Grooves 5 for resin injection path, which communicate with resin injection member 8 made of a metal pipe or a resin tube, are processed on intermediate plate 3 so as to extend radially, and through holes 6 for injection ports, each having a diameter of 5 mm, are processed on an intermediate portion and end portions the grooves 5. In this example, the width of the groove is 5 mm. the depth is 4 mm, and the length of each path radially extending is 540 mm. The circumference is sealed by O-ring 7, and the O-ring 7 is combined with the above-described elastic material 10a.

Figure 4A:
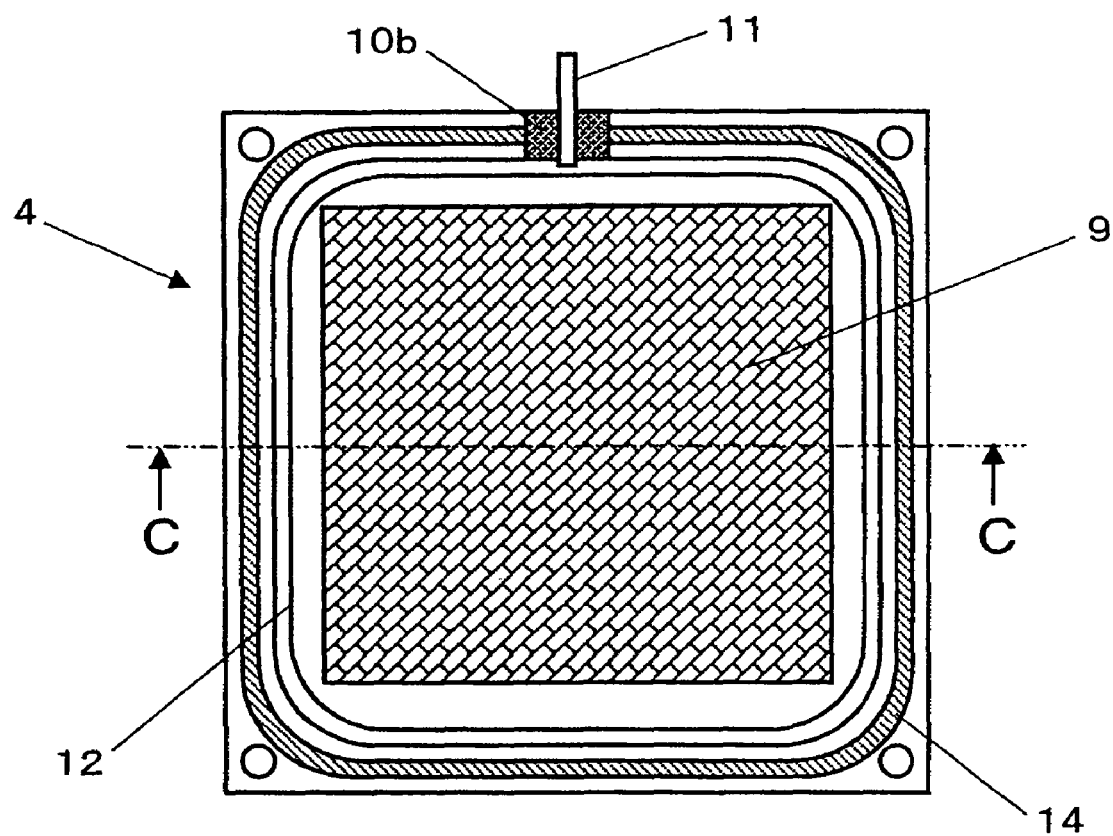
FIG. 4A is a plan view of a lower die of the device depicted in FIG. 1.
Figure 4B:
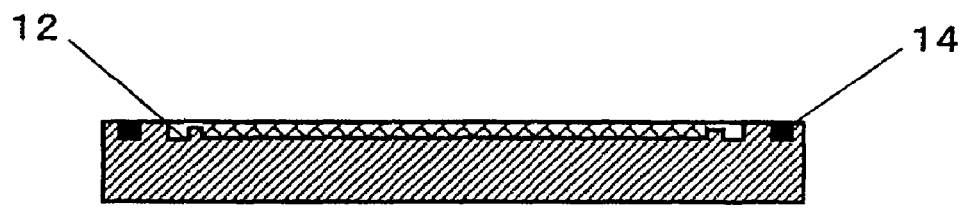
FIG. 4B is a sectional view as viewed along the line C-C of FIG. 4A.

FIG. 4 shows lower die 4, FIG. 4A is a plan view thereof, and FIG. 4B is a sectional view thereof as viewed along line C-C of FIG. 4A. Reinforcing fiber substrate 9 (for example, "TORAYCA" T300 woven fabric of plain weave CO6644B (weight: 300 g/m$^2$), 6 ply) is laid up on the central cavity portion of the molding surface. On the outer circumference side of the substrate, groove 12 for resin discharge after resin impregnation (runner: the dimension is 12 mm in width and 5 mm in depth.) is processed. An excessive resin is discharged to outside of the mold from resin discharge tube 11 having an outer diameter 12 mm and an inner diameter of 12 mm which is inserted into a part of the groove 12.

In the molding using upper and lower dies 2, 4 and intermediate plate 3 thus constructed, because a plurality of resin paths are formed by the intermediate plate 3, the resin injected from resin injection member 8, first, flows quickly in a direction along the surface of the intermediate plate 3, and the resin is delivered over a wide area. Then, because the resin is injected into reinforcing fiber substrate 9 substantially almost simultaneously from a plurality of positions through a plurality of through holes 6 provided appropriately, the resin is being well impregnated quickly into the reinforcing fiber substrate 9 over a wide area of the substrate 9. Namely, because the flow resistance of through holes 6 is higher than that in the resin paths, the injected resin is once stored on the surface of intermediate plate 3, and the resin is then impregnated from there into reinforcing fiber substrate 9 at a time through a plurality of through holes 6. As the result of an actual molding using an epoxy resin at a mold temperature of 90° C., occurrence of resin non-delivered portion can be prevented, and the time for resin injection and impregnation is greatly shortened to 1/10 or less of a conventional time, thereby achieving a high-speed molding.

Figure 6:
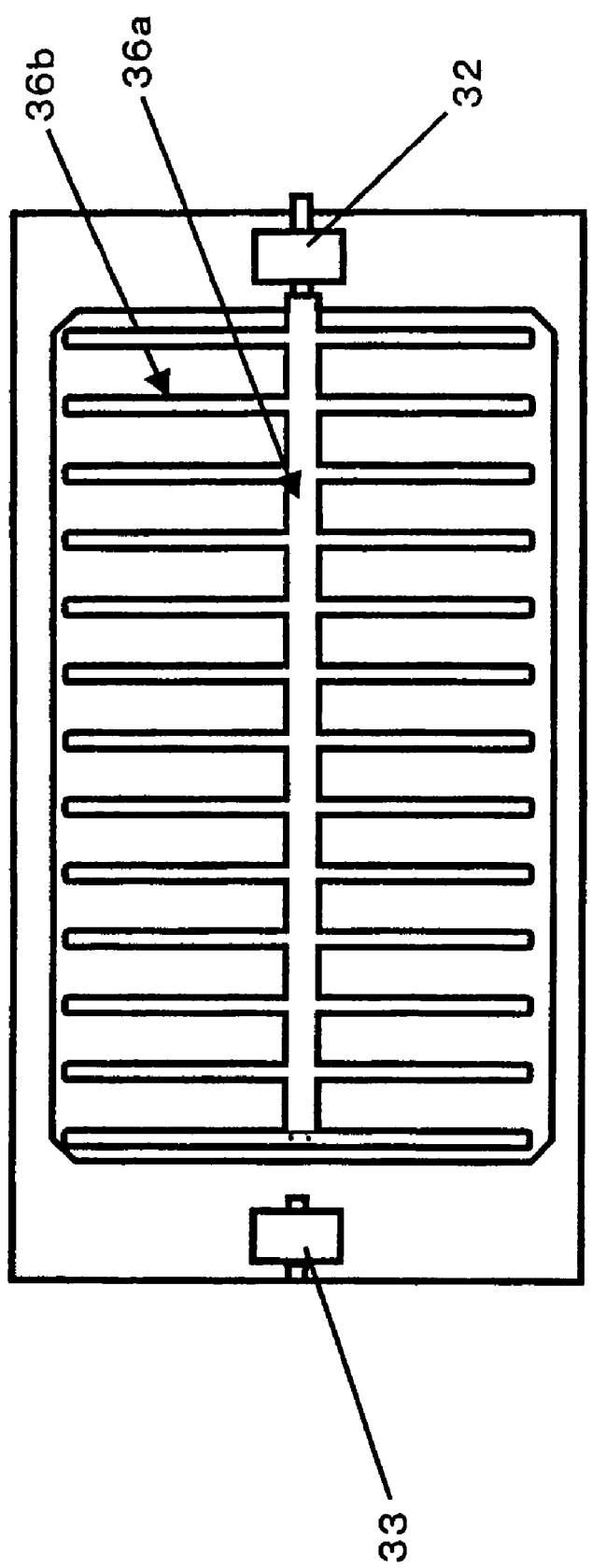
FIG. 6 is a bottom view of an upper die of the device depicted in FIG. 5.
Figure 7:
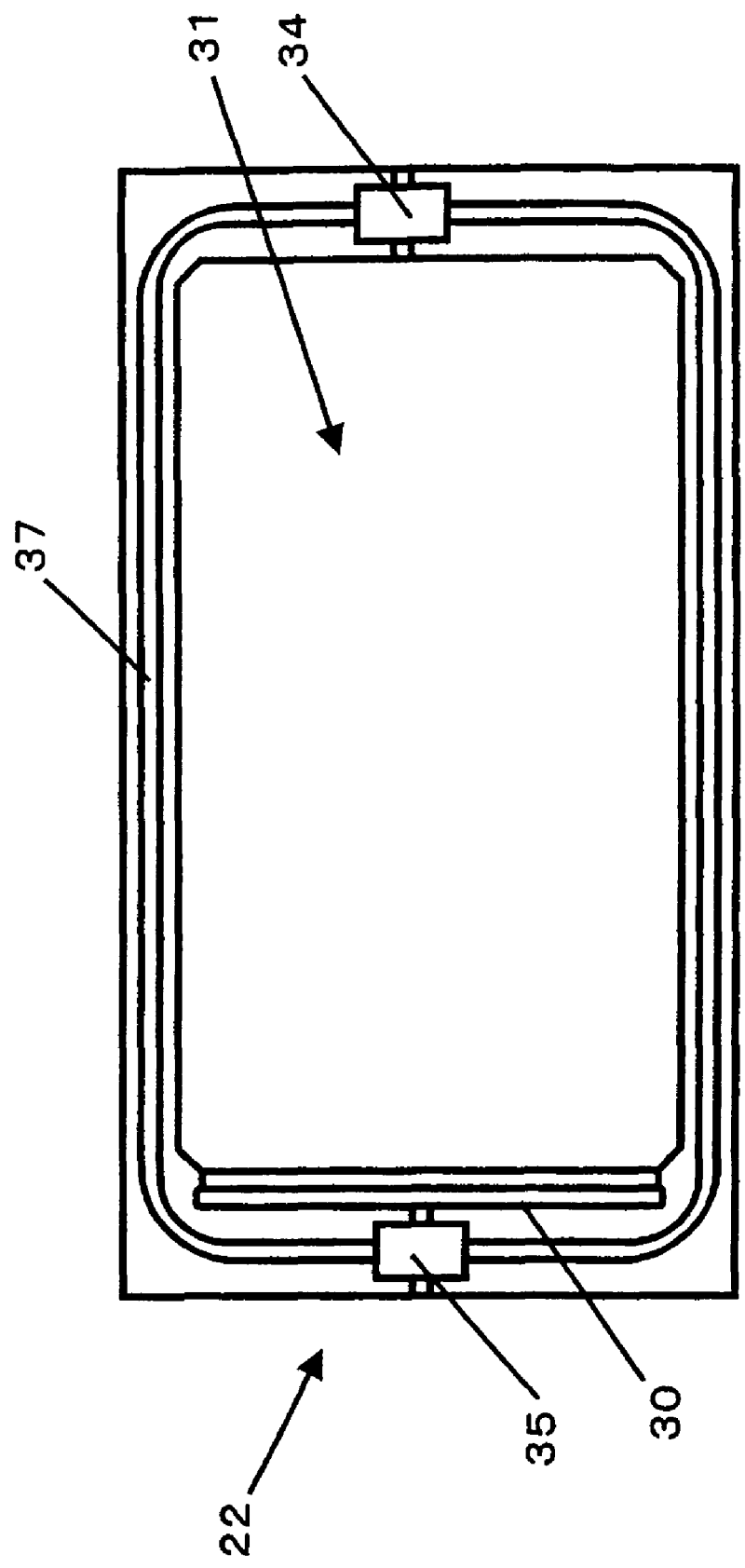
FIG. 7 is a plan view of a lower die of the device depicted in FIG. 5.

FIGS. 5 to 7 show RTM molding method and device according to another embodiment different from the above-described first embodiment. In FIG. 5, an intermediate member 24 consisting of a perforated plate an a perforated film (in this embodiment, a perforated plate) is set between an upper die 21 and a lower die 22 of a mold 20. Grooves 36a, 36b (FIG. 6) for resin paths are processed on upper die 21 so as to extend over the entire area. A clearance 25, a fine clearance 25 of about 1 mm in this embodiment, is formed between perforated plate 24 and upper die 21. Further, a more efficient resin flow and impregnation becomes possible if the positions of holes of a perforated plate or a perforated film coincide with the positions of the grooves formed on the upper die. Most of the resin flown from a resin injection member 26 sealed with a seal member 28 (for example, a rubber block) flows to the above-described clearance 25, and is filled in the space of the clearance 25. On perforated plate 24, fine through holes 24a (diameter: about 0.5 to about 3.5 mm) are opened over the entire area at a pitch of 3 to 8 mm. Therefore, the flow resistance of the resin of the perforated plate 24 is much higher than that in the resin flow to the above-described clearance 25. A reinforcing fiber substrate 23 is set in a cavity 31, upper die 21 is clamped, and vacuum suction is carried out through a discharge member 27 sealed with a seal member 29. The resin having been charged in the above-described clearance 25 is pressurized, and the resin is injected at a pressurized condition at a time over the entire area from through holes 24a of perforated plate 24. An excessive resin after impregnation flows a film gate/runner provided on the circumference of cavity 31, and it is discharged from discharge tube 27 to outside. After impregnation over the entire area, the discharge tube 27 is closed, and while the resin pressure is maintained, heating/curing is carried out. In die opening, upper die 21 is lifted up, a molded product is taken out together with perforated plate 24 from lower die 22, and the molded product is separated from the perforated plate 24. In a case where the separation from perforated plate 24 or a post processing for a molded product adhered with resin projections is troublesome, it had better to dispose a cloth for release (a woven fabric made of polypropylene or polyethylene: also called a peel ply) between perforated plate 24 and reinforcing fiber substrate 23 beforehand. Further, as the case may be, only a cloth for release may be disposed without disposing perforated plate 24.

FIG. 6 shows upper die 21, and thereon, grooves 36a, 36b for resin paths for distributing the resin to the molding surface side over its entire area are processed. As an example, a main path (width: 8 mm, depth: 5 mm) is present, and on both sides thereof, sub paths (width: 3 mm, depth: 3 mm) are processed almost up to the end at a pitch of 10 mm. Further, grooves 32, 33 are processed for disposing seal members 28, 29 for sealing between resin injection tube 26 or resin discharge tube 27 and the die.

FIG. 7 shows lower die 22, and thereon, cavity 31 for molding is processed on the die almost over the entire surface. A film gate and runner 30 connected to cavity 31 are processed on the resin discharge side. Grooves 34, 35 for disposing seal members 28, 29 for sealing between resin injection tube 26 or resin discharge tube 27 and the die, and groove 37 for O-ring for seal, are processed on the die at positions corresponding to those of upper die 21.

In the molding using thus constructed upper and lower dies 21, 22 and perforated plate 24 provided as an intermediate member, the resin is flown quickly in clearance 25 in the direction along the surface of perforated plate 24, and the resin is filled over a wide area. Because the resin is then injected into reinforcing fiber substrate 23 from a plurality of positions substantially almost simultaneously through many through holes 24a provided on perforated plate 24, the resin is well impregnated quickly into the reinforcing fiber substrate 23 over the wide area. Therefore, also in this embodiment, occurrence of resin non-delivered portion can be prevented, the time for resin injection and impregnation can be greatly shortened, and a high-speed molding can be achieved.

EXAMPLE 1

In the above-described respective embodiments, when molding was carried out setting the size of a mold at 1500 mm×1200 mm×depth 3 mm at the molding surface (the cavity surface), using a laminate of 8 plies of "TORAYCA" T700 cloth BT70-30 (300 g/m$^2$) produced by Toray Industries, Inc. as the reinforcing fiber substrate, and using a high-speed curing type epoxy resin (main ingredient: "Epicoat" 828 (an epoxy resin produced by Yuka Shell Epoxy Corporation), curing agent: blend TR-C35H (an imidazole derivative) produced by Toray Industries, Inc.) as the resin, in spite of a relatively large molded product, a good and quick molding could be carried out. The time for completing the impregnation of the resin into the substrate was 5 minutes or less at a resin injection pressure of 0.7 MPa, and could be shortened down to 1/5-1/10 or less of a conventional method.

Figure 9:
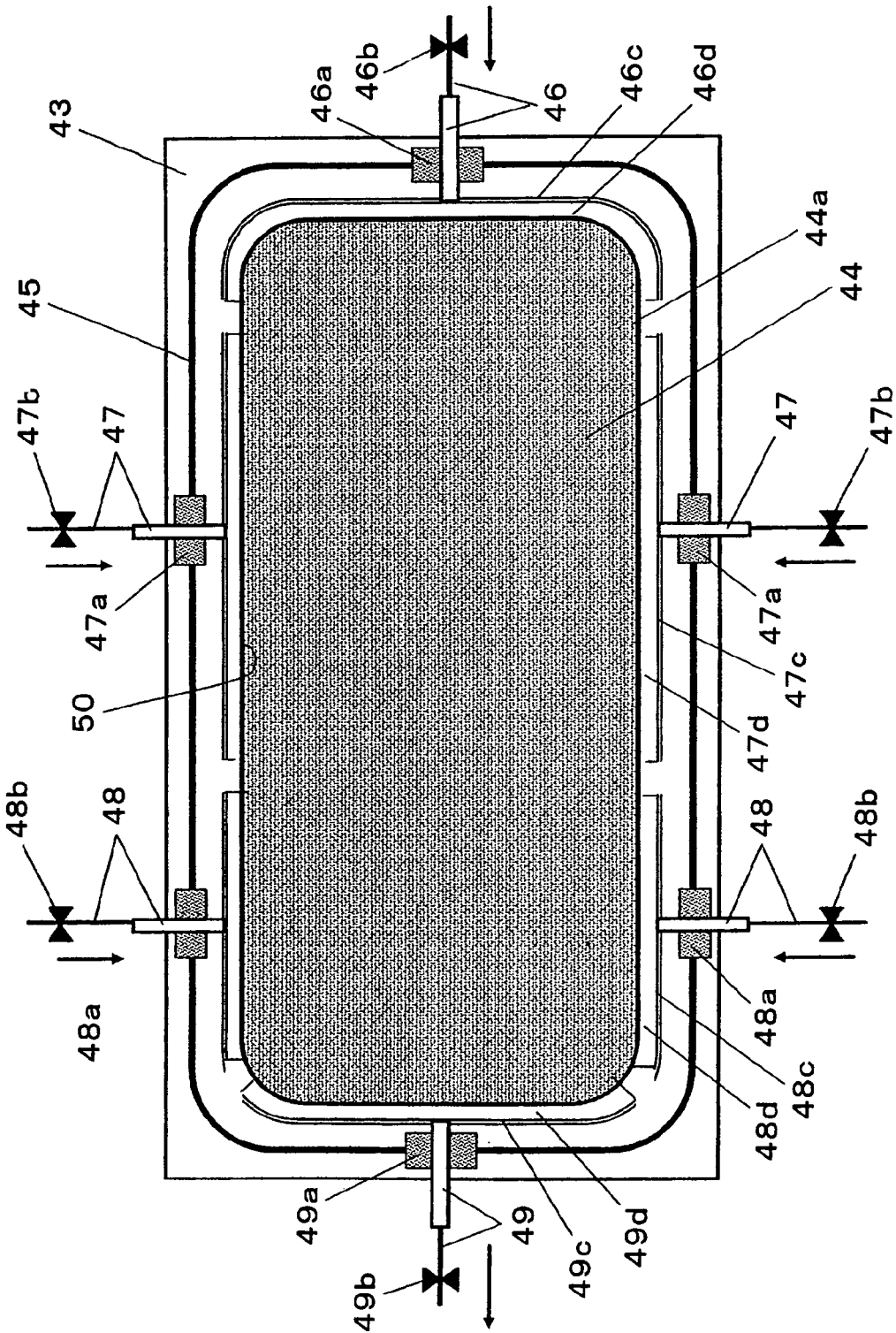
FIG. 9 is a plan view of a lower die of the mold depicted in FIG. 8.
Figure 10:
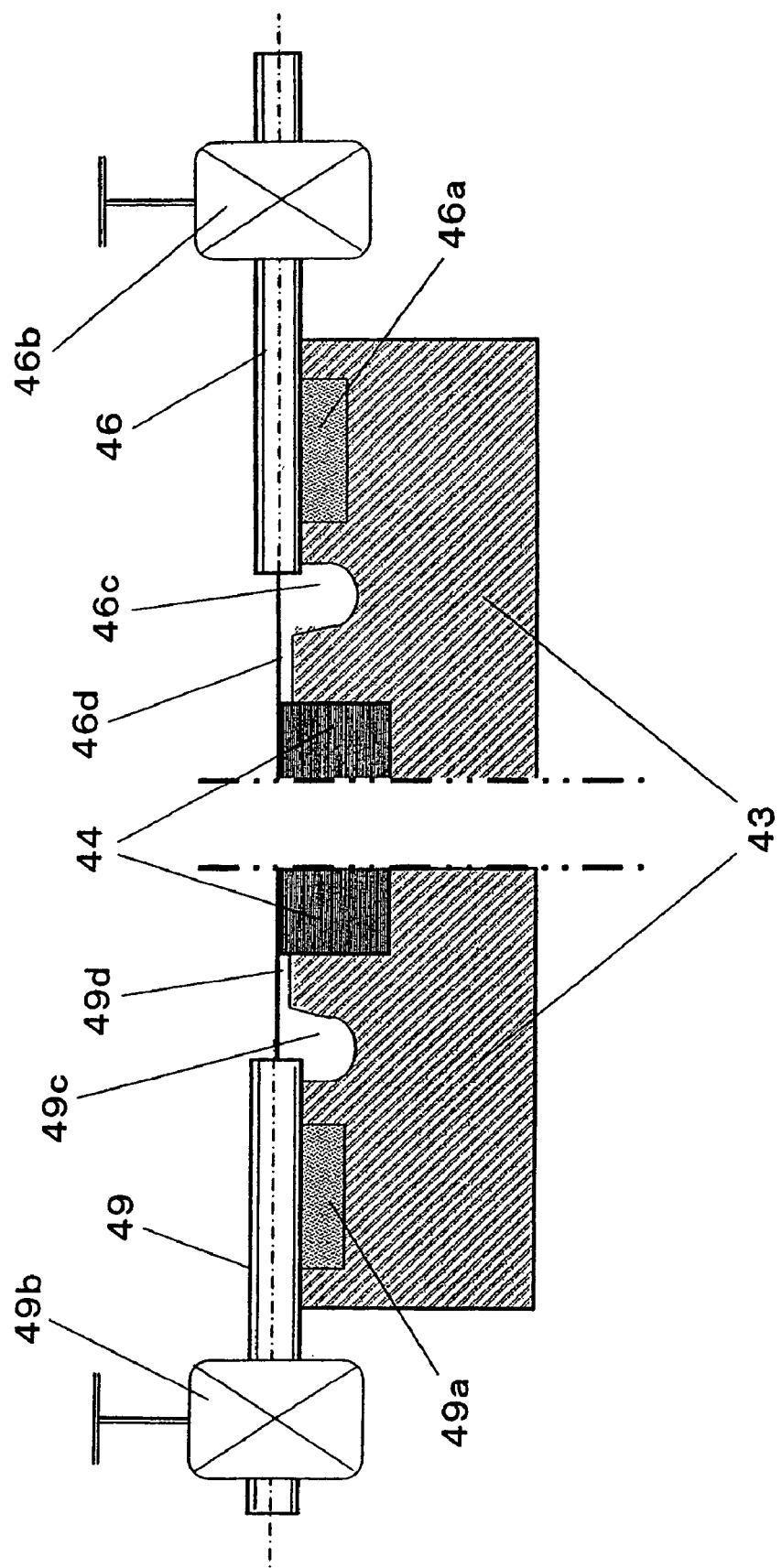
FIG. 10 is a vertical sectional view of the lower die depicted in FIG. 9.
Figure 11:
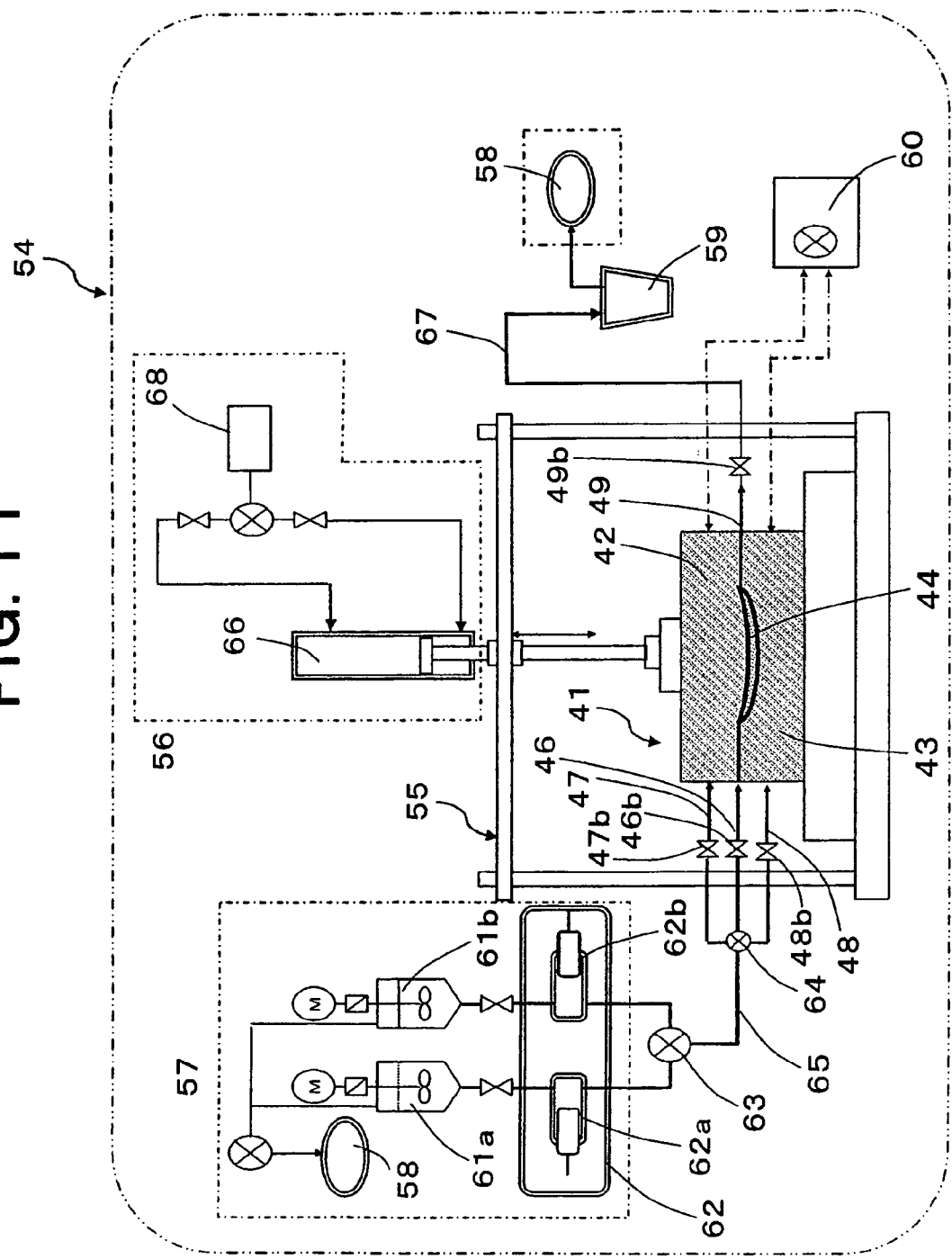
FIG. 11 is a schematic diagram of the whole of an RTM molding system using the RTM molding method and device according to the second embodiment.

FIGS. 8 to 12 show RTM molding method and device according to the second embodiment. FIG. 11 is a schematic diagram showing an example of a molding system 54 using an RTM molding device. A mold 41 for RTM molding comprises an upper die 42 and a lower die 43, and the upper die 42 is attached to a mold lifting device 55 lifted by a hydraulic device for mold lifting 56 with a hydraulic pump 68 and a hydraulic cylinder 66. A reinforcing fiber substrate directly, or a preform substrate 44 (a reinforcing fiber substrate) given with a product shape beforehand so as to be easily placed in the mold, is disposed on the lower die 43, and then, the upper die 42 is closed. As the material of the mold, an FRP, a cast steel, a structural carbon steel, an aluminum alloy, a zinc alloy, a nickel electrocast material, and a copper electrocast material can be raised. For mass production, a structural carbon steel is preferred from the viewpoint of rigidity, thermal resistance and workability.

A plurality of resin injection tubes 46, 47, 48 connected to a resin injection runner and a single discharge tube 49 connected to a discharge runner are provided to mold 41. The respective resin injection tubes 46, 47, 48 and discharge tube 49 are connected to resin injection path 65 and discharge path 67 via respective injection valves 46b, 47b, 48b and discharge valve 49b. In a resin injection device 57, the main ingredient is stored in main ingredient tank 61a and the curing agent is stored in curing agent tank 61b, respectively, and each tank has a mechanism for heating and vacuum degassing. At the time of resin injection, the resin is pushed out from the respective tanks toward the resin injection path 65 by a pressurizing device 62. The pressurizing device 62 uses syringe pumps 62a, 62b as an example, and for a resin cured by mixing of two liquids, it is preferred to ensure the quantitative property by pushing out the syringe pumps simultaneously. The pushed-out main ingredient and curing agent are mixed in a mixing unit 63, and the mixture reaches the resin injection path 65. Discharge path 67 is connected to a resin trap 59 in order to prevent a resin flow to a vacuum pump 58.

Although the number and the positions of the resin injection tubes are different in accordance with the shape or the dimension of the mold or the number of molded products to be molded simultaneously in a single mold, in order to prevent the injection operation from becoming troublesome by increase of the number of the positions for connecting the injection path 56, which extends from resin injection device 57, to resin injection tubes 46, 47, 48, the number of the injection tubes is preferably as few as possible. However, to mold a relatively large product at a high speed, it is possible to flow and impregnate the resin efficiently at a speed of several times relative to that in resin injection by a single injection tube, by using a plurality of resin injection tubes and carrying out the resin injection simultaneously or in order.

Figure 8:
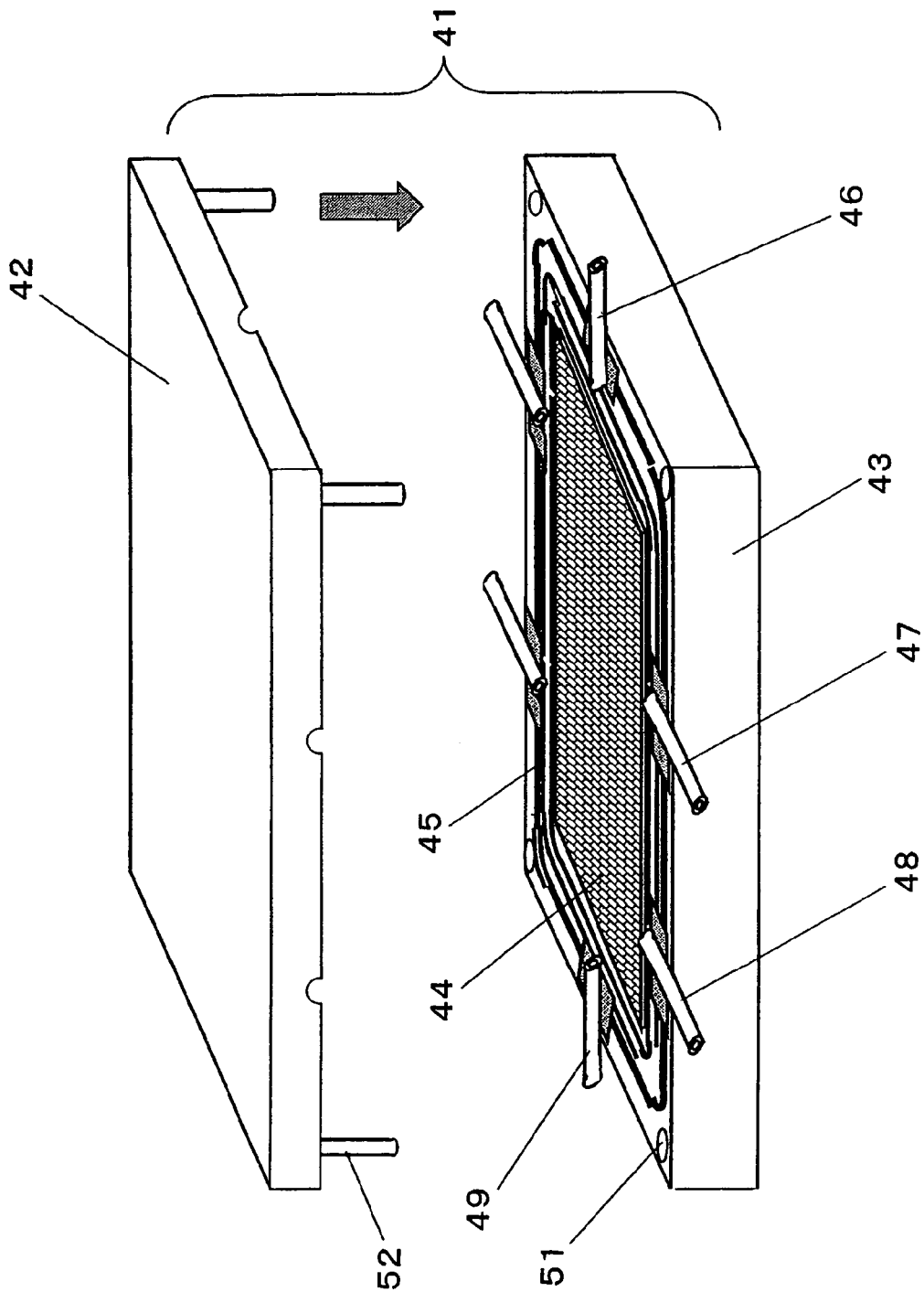
FIG. 8 is a perspective view of a mold used in RTM molding method and device according to a second embodiment.

FIG. 9 is a plan view of an RTM mold for a high-speed molding of a flat plate with rounds at its four corners, in particular, a plan view of lower die 43. As shown in FIG. 8, upper die 42 and lower die 43 are aligned in position with each other by inserting pins 52 provided on the side of upper die 42 into holes 51 for the pins provided on the side of lower die 43, and the dies are clamped at a closed condition interposing a mold seal 45 therebetween. FIG. 10 shows a vertical section of the mold depicted in FIG. 9. As explained referring to FIG. 9, in a conventional RTM molding method as a method for molding a flat plate, the resin is injected at a pressurized condition from injection tube 46 communicating with resin injection runner 46c and resin injection film gate 46d which form a resin injection line present on one side of outer sides of cavity 50 for molding, the resin flows toward discharge film gate 49d and discharge runner 49c which form a resin discharge line communicating with discharge tube 49 provided on the opposite position and present on another side of the outer sides of the cavity 50, and is impregnated into the reinforcing fiber substrate. Namely, it is a method for flowing the pressurized resin from the resin injection line to the reinforcing fiber substrate in the cavity of the mold and impregnating the resin into the substrate, from the single resin injection line which is formed at a single side of the outer sides of the cavity 50 of the mold (formed from resin injection runner 46c and resin injection film gate 46d communicating with resin injection tube 46), toward the single resin discharge line which is formed at another single side of the outer sides of the cavity of the mold (formed from resin discharge film gate 49d and resin discharge runner 49c communicating with resin discharge tube 49).

In this method, although a relatively short-time molding can be carried out and a mass production is possible in a case of molding a relatively small molded product, that is, in a case of a molded product the distance from the resin injection line to the discharge line of which is small, in a case of a large molded product, that is, in a case of a molded product the distance from the resin injection line to the discharge line of which is great, because the resin flow is damped at a condition of a high-order function, the time for the resin flow becomes long, and as the case may be, there is a case where the impregnation is not completed by the time of resin gelation. In such a case, although a method for injecting the resin at a high speed by using a low-viscosity resin or by increasing the pressure of the resin is employed, the reinforcing fibers may be disturbed by the pressure for the resin flow, or a limit for impregnation over the entire area of the product to be molded may exist depending upon the size or the shape of the product to be molded.

In a case where a high-speed molding and a mass production are difficult by the conventional RTM molding method because the product to be molded is large as described above, as shown in FIG. 9, the problem can be solved by providing the resin injection line not at a single side of the outer sides of cavity 50 for molding but at a plurality of positions. Namely, by adding resin injection tubes 47, 48 toward resin discharge line 49 except the conventional resin injection tube 46 as the resin injection line, and injecting the resin simultaneously or in order from the resin injection line formed by resin injection runner 46c and resin injection film gate 46d, the resin injection line formed by resin injection runner 47c and resin injection film gate 47d and the resin injection line formed by resin injection runner 48c and resin injection film gate 48d, the problem of the resin flow damped at a condition of a high-order function can be solved. Namely, it is to provide the resin injection line and the resin discharge line so as to extend substantially over the entire area of the outer circumference of the product to be molded (that is, the whole of the reinforcing fiber substrate). A particularly effective method is to provide the resin injection line over the half or more of the outer circumference, and more desirably, if the resin injection line is disposed so as to become two times or more of the resin discharge line, an extremely efficient and high-speed molding becomes possible. Symbols 46a, 47a, 48a 49a in FIG. 9 indicate rubber members for seal, respectively.

It is necessary to decide depending upon the size and shape of a molded product as to whether the resin injection from resin injection tubes 47, 48 supplementing the resin injection from resin injection tube 46 should be carried out or not and as to the injection timing thereof. Further, in such a case, because the resin supplemented from the resin injection tubes 47, 48 is likely to flow easily to the side portion rather than the central portion of the substrate, there is a case where a correction becomes necessary such as making the length of the resin discharge line shorter than that of one side or changing the position of resin discharge tube 49.

Furthermore, in a case where the product to be molded has a relatively symmetric shape such as a flat plate shown in FIG. 8 and FIG. 9 or the L/D (a ratio of length to width) is relatively large, for example, the L/D is two times or more, a method is also effective for setting the resin injection line from resin injection tube 46 to a resin discharge line from the initial stage except resin discharge line 49, and efficiently impregnating the resin by dividing the resin injected from the resin injection tubes 47, 48 in the left and right directions.

Further, it is also effective to switch the resin discharge line to the resin injection line at the time when the resin is injected almost over the entire area of the reinforcing fiber substrate or on the way thereof. Namely, in a case where the resin flowability is bad and the resin does not reach the resin discharge line even if the flowing out of the resin into the resin discharge line is waited, by injecting the resin from the resin discharge line, non-impregnation of the resin can be prevented.

For example, a resin detection sensor for detecting a resin flow state is disposed in the mold, and in a case such as one where the gelation of the resin begins and the flow is stopped before the resin reaches the resin discharge line, the resin injection from the resin discharge line is effective to prevent non-impregnation.

It is necessary to consider ensuring of an enough flow rate and conformity with the resin (thermal resistance, solvent resistance, pressure tightness, etc.) for the material of resin injection path 65 and resin injection tubes 46, 47, 48. Tubes having an inner diameter of 5 to 30 mm are used for the injection path and the injection tubes, a pressure tightness of 1.0 MPa or more is required to resist the resin injection pressure, and a thermal resistance of 100° C. or higher is required to resist the temperature at the time of resin curing. For this, for example, a tube of "Teflon" (registered trade mark) having a thickness of about 2 mm is suitable. However, except "Teflon" (registered trade mark), a relatively cheap polyethylene tube or nylon tube, further, a metal tube made of a steel, aluminum, copper, etc. may be employed.

Although the number and the position of resin discharge tube 49 are different in accordance with the shape and the dimension of the mold, the number of products to be molded simultaneously in a single mold, etc., the number of resin discharge ports is preferably as few as possible from the viewpoint of stable resin flow and easy operation for controlling the resin flow.

It is necessary to consider ensuring of an enough flow rate and conformity with the resin (thermal resistance, solvent resistance, pressure tightness, etc.) also for the material of resin discharge tube and the resin discharge path similarly to in the resin injection path 65, etc. Although a tube made of a metal such as a steel or an aluminum, or a tube made of a plastic such as polyethylene or "Teflon" (registered trade mark), can be raised as the resin discharge path 67, a tube made of "Teflon" (registered trade mark) having a diameter of 5 to 10 mm and a thickness of 1 to 2 mm is more preferable from the viewpoint of workability.

It is possible to open/close injection valves 46b to 48b and resin discharge valve 49b provided for the time of resin injection from resin injection paths 46 to 48 and provided on the way of resin discharge path 49 or to change the diameters thereof by nipping the valves directly by an operator with vice grips, etc. Further, it is possible to dispose an actuator at the handle portion of the vice grip for automatic operation or to apply a valve opening/closing device using an electromagnetic valve or an air operation valve instead of the vice grip. Further, it is preferable to carry out a more accurate opening/closing operation by connecting this valve opening/closing device to a memory device inputted with information of valve opening degree beforehand. Moreover, it is also possible to control the resin discharge valve 49b not merely at two values of opening and closing but to change the diameter of the flow path (adjustment of opening degree of a ball valve).

For pressurization of resin, if a method of pressurization by a syringe pump, etc. is employed, a quantitative property can also be obtained. The resin injection pressure is preferably in a range of 0.1 to 1.0 MPa. Where, the resin injection pressure means the maximum pressure pressurized by pressurization device 62.

When the resin is completely impregnated into the reinforcing fiber substrate in the mold and the resin has reached up to the resin discharge tube 49 and the resin discharge path 67, the discharge valve 49b is closed, thereafter, for a while the inside of the mold is maintained at a pressure pressurized by the resin pressurization device 62, and after that, the resin injection is finished by closing the resin injection valves 46b to 48b. The mold is being heated by a heat medium circulation type temperature controller 60, and by this, the resin is cured. As the heat medium, water, steam, mineral oil, etc. can be used.

In the RTM molding carried out by the above-described RTM molding device (RTM molding system) 54, in order to stably obtain a high-quality FRP molded product excellent in appearance quality without defects such as voids and having desired mechanical properties, a molding condition from resin injection, impregnation up to curing is very important as well as rationalization of advance preparation such as cutting and lamination of the reinforcing fiber substrate, making is as a preform, and lay up into the mold. In particular, it is necessary to set the production conditions considered with productivity (efficient production).

For this, it is necessary that the already pointed out "resin injection pressure," "molding temperature," "resin flow rate," "thermal property of resin," etc. are set at values corresponding to the molding dimension sufficiently in consideration of the properties of the reactive resin. In particular, because a reactive resin material, which is gelated in a short period of time and quickly cured although it has a good flowability, is employed in consideration of efficiency of production, a high-speed flow and impregnation becomes necessary.

However, if the resin pressure is increased and the resin injection is carried out at an increased flow rate, as aforementioned, disturbance of the substrate and voids and pits on the surface are liable to occur. Therefore, because there occurs a problem of the aforementioned appearance quality merely by increasing the flow rate, it is necessary to set a resin flow rate proper for the substrate to be impregnated, namely, a flow rate corresponding to the area of the substrate.

In the RTM molding method and device according to this embodiment, included are not only a usual RTM molding method wherein the mold comprised upper and lower dies having parting surfaces, while the pressurized resin is flown from the resin injection port, the resin is discharged together with air in the mold at the resin discharge port, the discharge port is closed at the time of completing the discharge of air, and the resin in the mold is cured while pressurized, but also an RTM molding method wherein the resin is injected while air in the mold is discharged or after the air is almost discharged by vacuum suction, thereafter, the suction port is closed and the resin is injected at a pressurized condition and cured, and further, a vacuum RTM molding method wherein the cavity portion of the mold is covered with a bagging material such as a film at its one surface, after the cavity portion is sucked at a vacuum condition, and the resin is injected into the cavity portion by the vacuum pressure and molded.

EXAMPLE 2

Figure 12A:
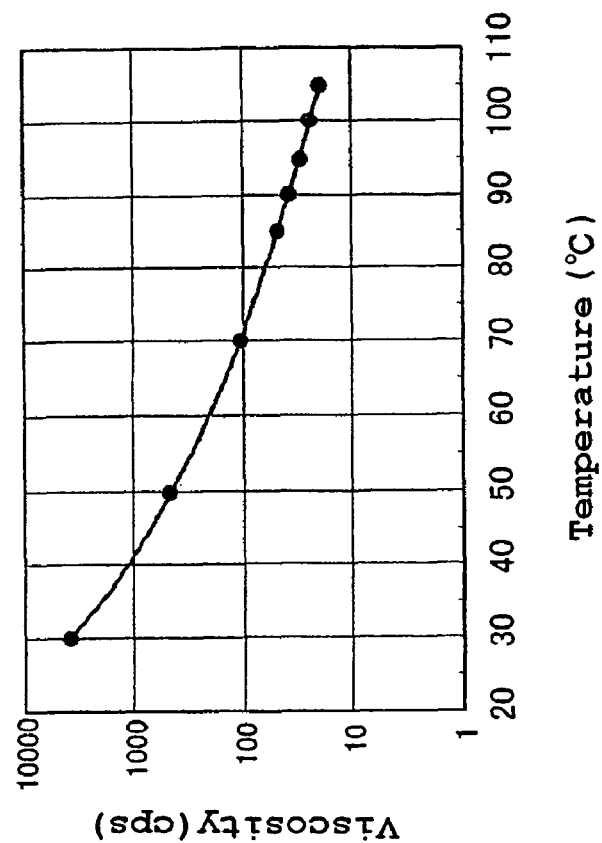
FIG. 12 shows graphs of characteristics of a resin used in our examples.
Figure 12B:
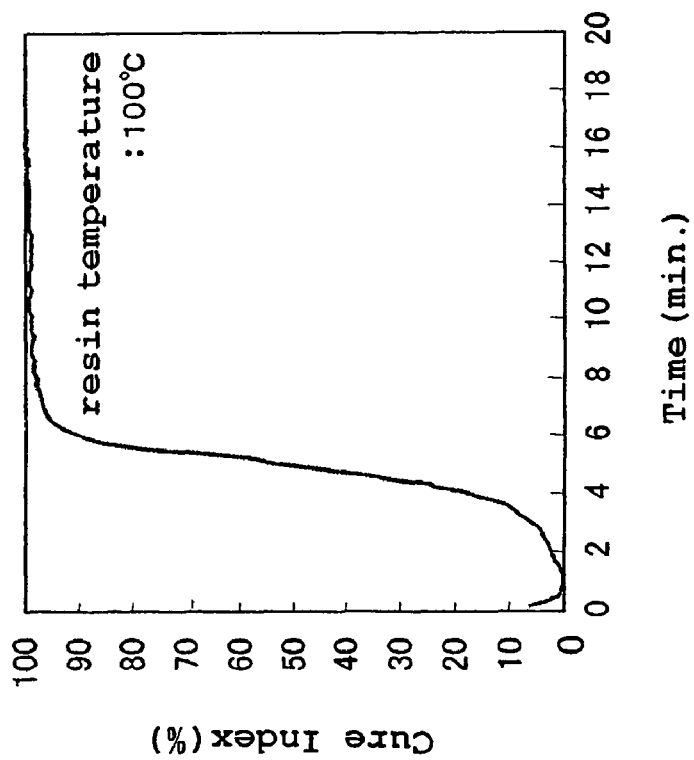

In the RTM molding system 54 according to this embodiment shown in FIG. 11, as an example of molding at molding conditions, an example of molding of a large flat plate (length of 1600 mm×width of 700 mm×height (thickness) of 2 mm) will be explained. The whole of the RTM mold 41 used in this example is shown in FIGS. 8 and 9, and the relationship between the temperature and the viscosity of the resin used for the molding and the property in resin curing degree-time at the molding temperature are shown in FIG. 12A and FIG. 12B, respectively. On the molding cavity portion 50 provided on the lower die 43 of the mold 41 (length: 2000 mm, width: 1000 mm and height: 350 mm in each of upper die 42 and lower die 43) having resin injection tubes 46 to 48 and discharge tube 49, carbon fiber "TORAYCA" cloth (CO6343B: T300B-3K, weight: 192 g/m$^2$) is laminated by 8 plies (0/90° oriented substrates: 4plies, ±45° oriented substrates: 4 plies), a preform substrate 44 given with a plate shape in advance was disposed, and the upper die 42 was closed by the die lifting device 55 and the mold was completely closed. A pressure of 200 tons was being applied to upper die 42 by the die lifting, device 55. Further, the upper die 42 and the lower die 43 are heated almost uniformly and constantly at 100° C. by temperature controller 60 (FIG. 12).

As shown in FIG. 10, the resin injection line provided on lower die 43 (for example, at the position of resin injection tube 46) is formed by resin injection tube 46 communicating with resin injection path 65 via divergent tube 64 and interposed with injection valve 46b on the way, resin injection runner 46c for storing the resin injected from the resin injection tube at a pressurized condition temporarily at a line-like condition, and resin injection film gate 46d (clearance relative to the upper die: 0.5 mm) for communicating with the runner 46c and injecting the resin into the cavity. In a similar manner, as shown in FIG. 9, other resin injection tubes 47, 48 disposed symmetrically at a pair condition are provided. Further, the resin discharge line is formed by resin discharge tube 49 communicating with resin discharge path 67 and interposed with resin discharge valve 49b on the way, resin discharge runner 49c communicating with the resin discharge tube and storing the discharged resin temporarily at a line-like condition, and resin discharge film gate 49d (clearance relative to the upper die: 0.5 mm) for communicating with the runner 49c and discharging the resin from the cavity together with gas, etc., and it is provided on a single side.

Consequently, substantially almost the entire circumference of the cavity is surrounded by the resin injection line and the resin discharge line. Further, the length of the resin injection line is nearly five times the length of the resin discharge line.

Tubes made of "Teflon" (registered trade mark) each having a diameter of 12 mm and a thickness of 1.5 mm were used as resin injection path 65 and resin injection tubes 46-48 shown in FIG. 11. On the other hand, tubes made of "Teflon" (registered trade mark) each having a diameter of 16 mm and a thickness of 2 mm were used as discharge path 67 and discharge tube 49. To prevent the resin from flowing into vacuum pump 58, resin trap 59 was provided on the way of discharge path 67.

Further, to seal between resin injection tubes 46-48 or discharge tube 49 and lower die 43, rubber members for seal 46a-49a are disposed, and to maintain a tight condition between the upper and lower dies, a mold seal member (O-ring) 45 is disposed, on the outer circumference of the cavity, respectively.

In the above-described molding device, after air in the mold (in the cavity portion) is discharged from resin discharge port 49 by vacuum pump 58 and the pressure in the mold is confirmed to be reduced down to 0.1 MPa or less by a vacuum pressure meter (not shown), the injection of the epoxy resin pressurized by resin injection device 57 having pressurization device 62 is started. The pressurization device 62 uses syringe pumps 62a, 62b, and it is structure so as to prevent back flow of the resin to the tank side at the time of resin injection. The used resin is a liquid epoxy rein prepared by mixing "Epicoat" 828 (an epoxy resin produced by Yuka Shell Epoxy Corporation) as its main ingredient and TR-C35H (imidazole derivative) of a blend produced by Toray Industries, Inc. as its curing agent. The characteristic of viscosity-time at the mold temperature, that is, at a molding temperature of 100° C., in more detail, the value of cure index, which is used as an index for tracing a curing profile of the resin during viscosity change of epoxy resin composition, is shown in FIG. 12A. From this graph, the resin becomes more than 90% in cure index in a time of about 6 minutes, and reaches a condition capable of being removed from the mold.

In resin injection device 57, while main ingredient 61a and curing agent 61b are stirred beforehand, the resin is heated at 60° C. to reduce the viscosity down to a predetermined viscosity, and removal of bubbles is carried out by vacuum pump 58.

Because air in the stirred resin mixing unit and air in the hose for resin injection path enter into the mold at the initial time of resin injection, the resin was not flown into the mold, the resin mixed with air was wasted from a divergent path (not shown), and after it was confirmed that air was not mixed in the resin, the pressurized resin was injected into the mold. Further, the discharge condition of each syringe pump 62a, 62b of the pressurization device was set at 50 cc/stroke. After the initial resin mixed with gas was wasted, the resin was injected into the mold by opening injection valve 46b after confirming the injection resin pressure (0.6 MPa) by an injection pressure sensor (not shown) disposed on resin injection path 65. At the time of starting the injection, discharge valve 49b of discharge tube 49 was opened.

After a time of 1 minute and 30 seconds passed from the start of the resin injection from resin injection tube 46, valve 47b of resin injection tube 47 was opened, and the resin injection from the resin injection tube 47 was started. Then, after a time of 1 minute further passed, valve 48b of resin injection tube 48 was opened, and the resin injection from the resin injection tube 48 was started.

During that, as the operation for accelerating impregnation of the resin into the reinforcing fiber substrate and efficiently removing a fine amount of bubbles stored in the substrate, the opening/closing operation of discharge valve 49b was carried out four times using a vice grip.

After a time of 3 minutes and 30 seconds passed from the start of the resin injection from resin injection tube 46, the resin flowed out into discharge tube 49. Then, after the resin was flown out for about 30 seconds as it was, valve 49b of discharge tube 49 was closed. It was about 4 minutes after the start of resin injection.

At the above-described state where the resin injection and impregnation was completed, the resin pressure of 0.6 MPa was kept for 30 seconds, and thereafter, the heating condition was maintained for 12 minutes, and then, the molded product was taken out from the mold.

When the appearance over the entire area of the molded product was determined, there were not voids and pinholes at all, and it was a good product extremely excellent in design quality.

COMPARATIVE EXAMPLE 1

As Comparative Example 1, in a case where, using the above-described molding device and under the above-described conditions, the resin was not at all injected from resin injection tubes 47, 48 (runners 47c, 48c and film gates 47d, 48d were closed) and the molding was carried out only by the resin from resin injection tube 46, about 11 minutes was required for the resin injection and impregnation, and non-impregnated portion of about 400 cm$^2$ was generated near the discharge portion.

EXAMPLE 3

Although the above-described Example 2 employed a single plate structure of reinforcing fiber substrate, as another example, when employed was a carbon fiber reinforcing structural material including a foam core (thickness: 10 mm, apparent specific gravity: 0.1) therein (three plies of the above-described carbon fiber "TORAYCA" cloths were stacked on each of the upper and lower surfaces of the foam core), an almost similar molded product excellent in surface quality could be obtained. The time for impregnation was about 4.5 minutes, and was a short period of time similarly to the above-described example.

Figure 13:
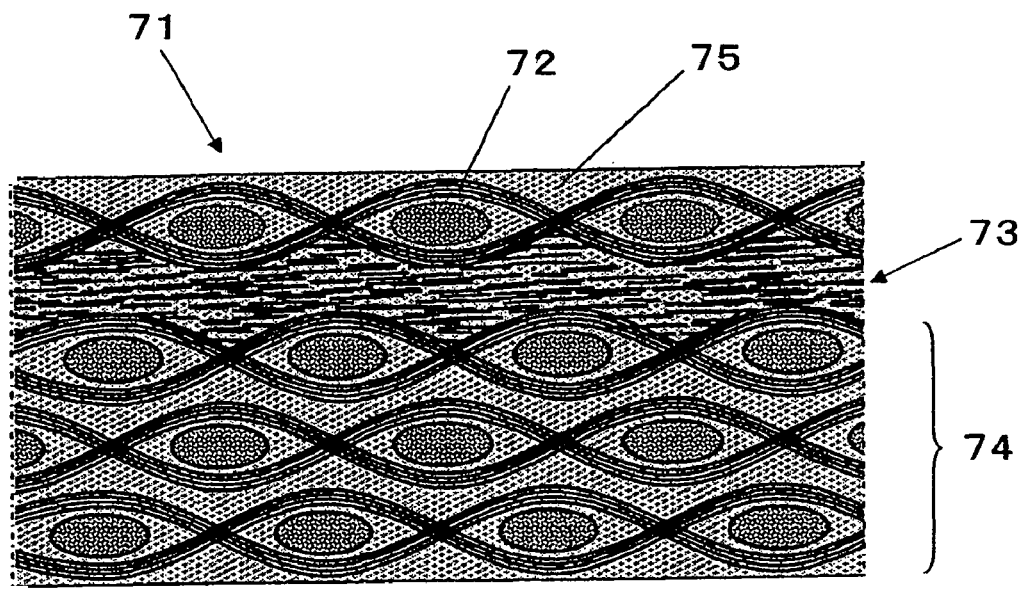
FIG. 13 is a partial sectional view showing a structure of a preform substrate of fiber reinforced resin molded by an RTM molding method according to a third embodiment.
Figure 15:
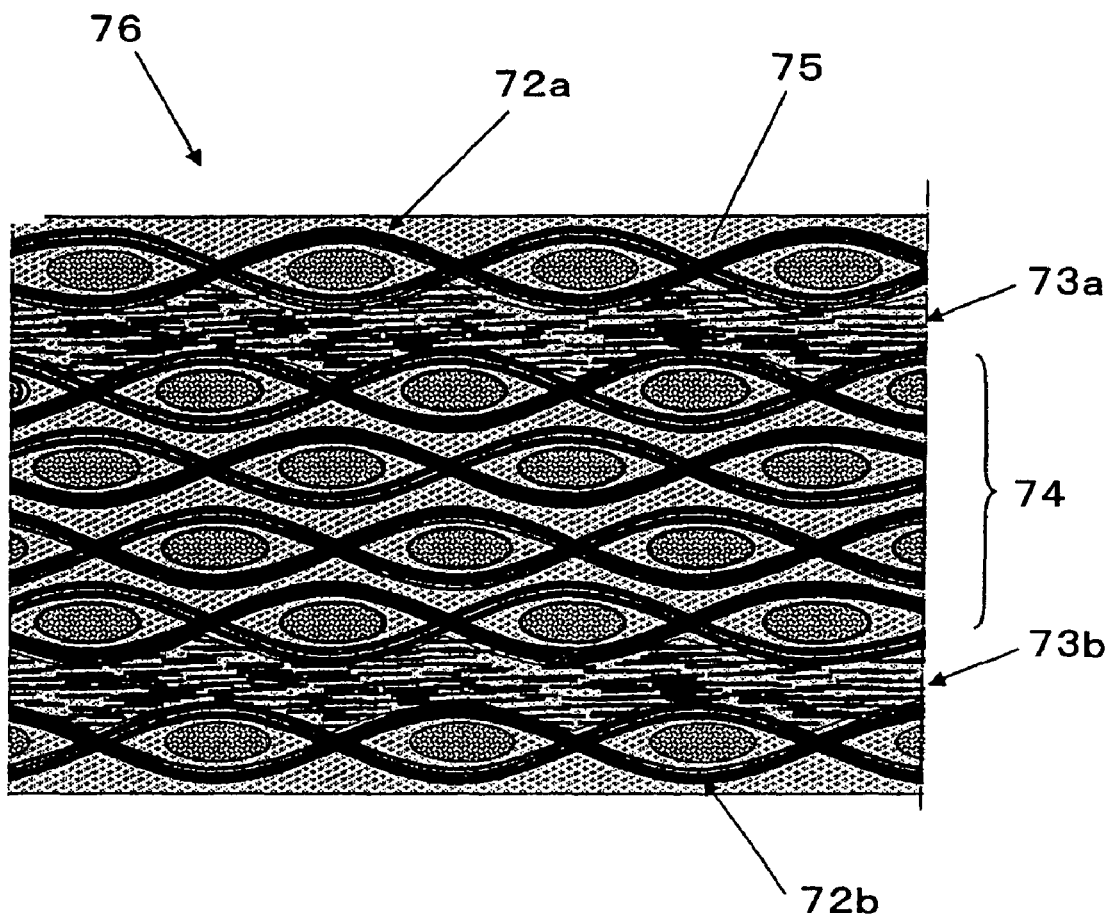
FIG. 15 is a partial sectional view showing a structure of a preform substrate of fiber reinforced resin molded by an RTM molding method according to another embodiment different from the third embodiment.
Figure 18A:
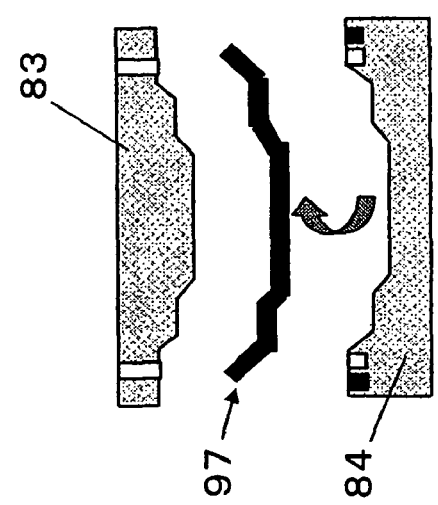
FIGS. 18A to 18C are schematic diagrams showing a molding method capable of being used in the third embodiment.

Next, an RTM molding method according to a third embodiment will be explained. First, the production of the fiber reinforced resin molded by this RTM molding method will be explained referring to FIG. 18. As shown in FIG. 18A, a resin injection port 85 and a suction port 86 are provided on an upper die 83 of the double-sided mold. Lower die 84 has a runner for resin injection 88 and a runner for suction 89, and a seal groove 90 is formed around the cavity. These upper and lower dies 83, 84 are being heated up to a predetermined temperature. After preform substrate 87 as the reinforcing fiber substrate is placed on the cavity surface of lower die 84, upper die 83 is lowered, and the substrate is set in the cavity formed with the upper die and the lower die 84. As the structure of this preform substrate, as shown in FIG. 13 and FIG. 15, a random mat layer is disposed immediately under the continuous fiber substrate of the surface layer.

Figure 18B:
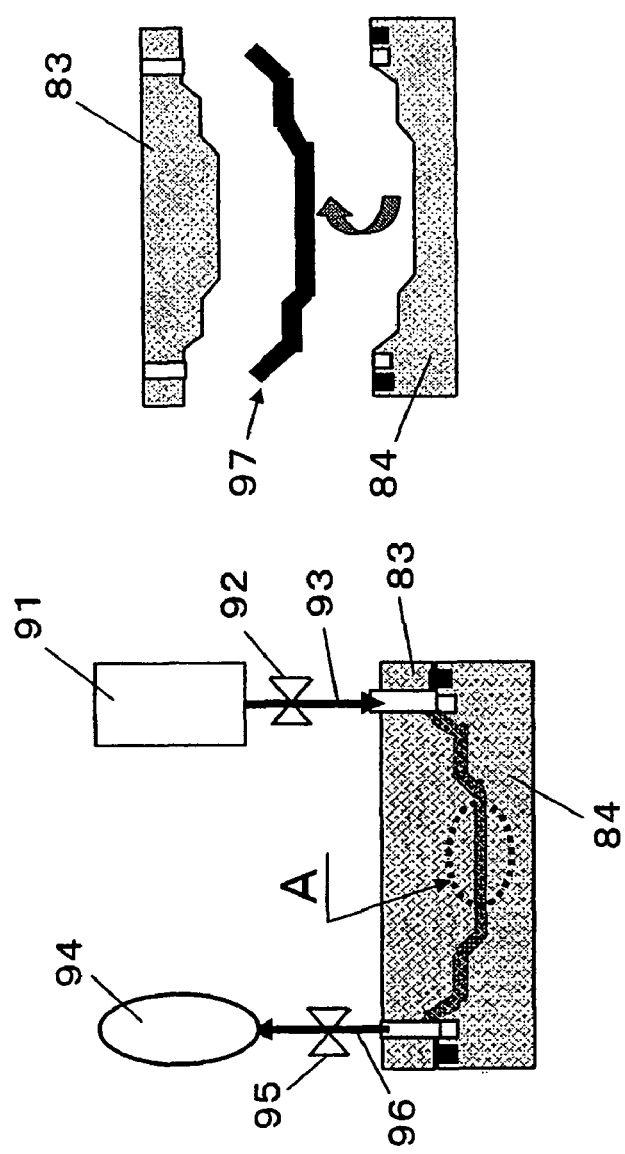

At such a condition, as shown in FIG. 18B, resin injection route 93 communicating with resin tank 91 is closed by valve 92, and suction route 96 communicating with vacuum pump 94 is opened by valve 95. Then, the inside of the cavity is sucked at a vacuum condition through suction port 86 and runner for suction 89 communicating with the suction route 96. Thereafter, at a condition where the valve 95 of the suction route is opened, the valve 92 of the resin injection route 93 is opened, while the matrix resin in resin tank 91 is pressurized by the pump, the resin is injected into injection port 85 through the resin injection route 93, and the resin is injected at a pressurized condition from the runner for resin injection 88 into the cavity. When the resin flows over the entire area of the cavity and is impregnated into the reinforcing fiber substrate 87 over its entire area and an excessive resin flows out to suction route 96 through suction port 86 together with bubbles resident in the cavity, particularly in the reinforcing fiber substrate, the valve 95 of the suction route 96 is closed, the resin pressure (static pressure) is applied to the inside of the closed cavity for a while, thereby ensuring the impregnation. Then, the valve 92 of the resin injection route 93 is closed, and the resin is cured by maintaining the heating condition for a predetermined period of time.

Figure 18C:
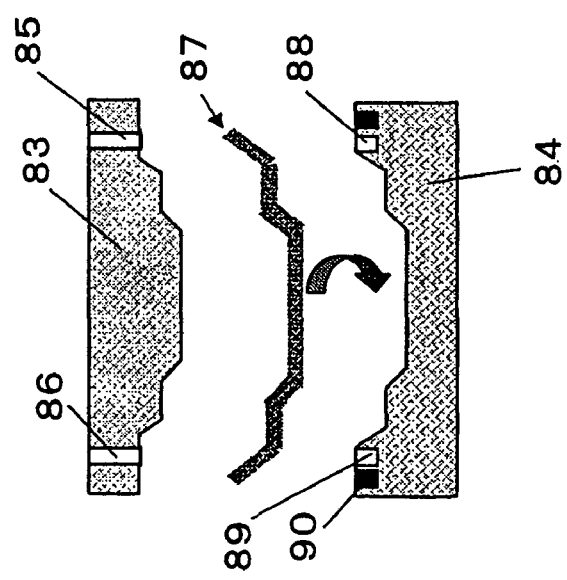

Thereafter, as shown in FIG. 18C, upper die 83 is lifted, and molded product 97 left on lower die 84 is taken out from the mold. The method for producing the fiber reinforced resin can be applied to other methods such as a vacuum molding method, a preprog/autoclave curing method, an RFI (Resin Film Infusion) or a semipreg/oven heat curing method.

By the above-described production method, the fiber reinforced resin was produced as follows.

EXAMPLE 4

As shown in FIG. 13, when a fiber reinforced resin 71 was produced, 1 ply of "TORAYCA" T300 woven fabric CO6343B (weight: 200 g/m$^2$) produced by Toray Industries, Inc. was placed as a surface layer 72 (continuous fiber layer), and as a layer immediately under the surface layer, a random mat layer 73 made of glass fibers (weight: 70 g/m$^2$) was disposed. Thereunder, a reinforcing fiber substrate 74 with a three-layer structure ("TORAYCA" T700 woven fabric BT70-30 produced by Toray Industries, Inc., weight: 300 g/m$^2$) was disposed as a reinforcing layer to form the preform substrate 87. Using this preform substrate 87, a CFRP (carbon fiber reinforced plastic) was molded by the RTM molding method shown in FIGS. 18A-18C. At that time, the temperature of the mold (formed by the upper die 83 and the lower die 84) was 95° C., and the epoxy resin 75 kept at 60° C. was injected at a pressurized resin pressure of 0.6 MPa from the resin tank 91 having a vacuum degassing function, and the molding was carried out. Where, the resin tank 91 is formed from a tank for a main ingredient of epoxy resin and a tank for a curing agent.

Figure 14:
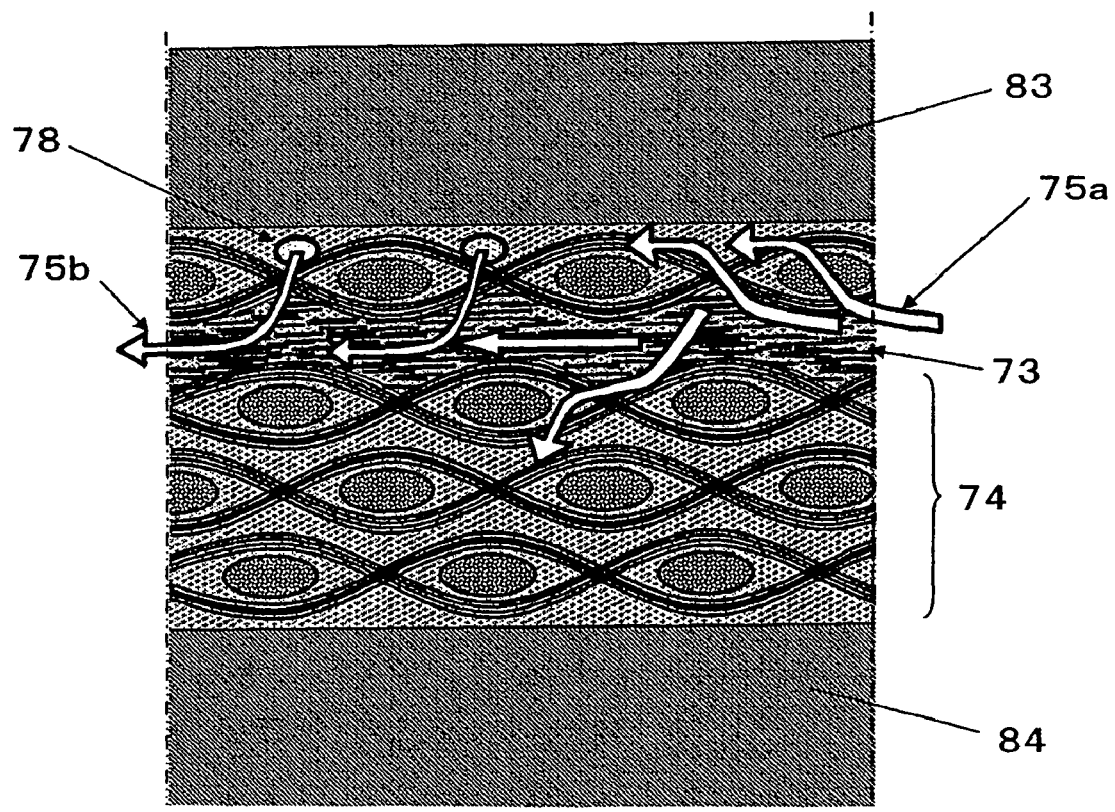
FIG. 14 is a partial sectional view showing an aspect at the time of injecting and impregnating resin into the substrate depicted in FIG. 13.
Figure 17A:
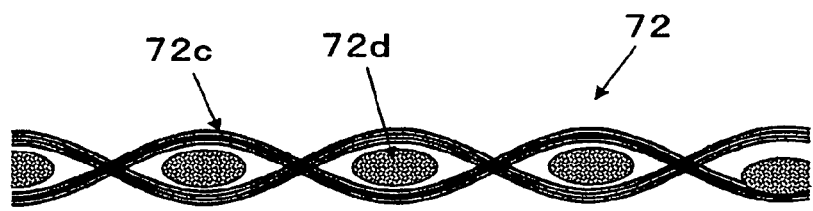
FIG. 17A is a partial sectional view of the surface layer substrate of the preform substrate depicted in FIG. 13.
Figure 17B:
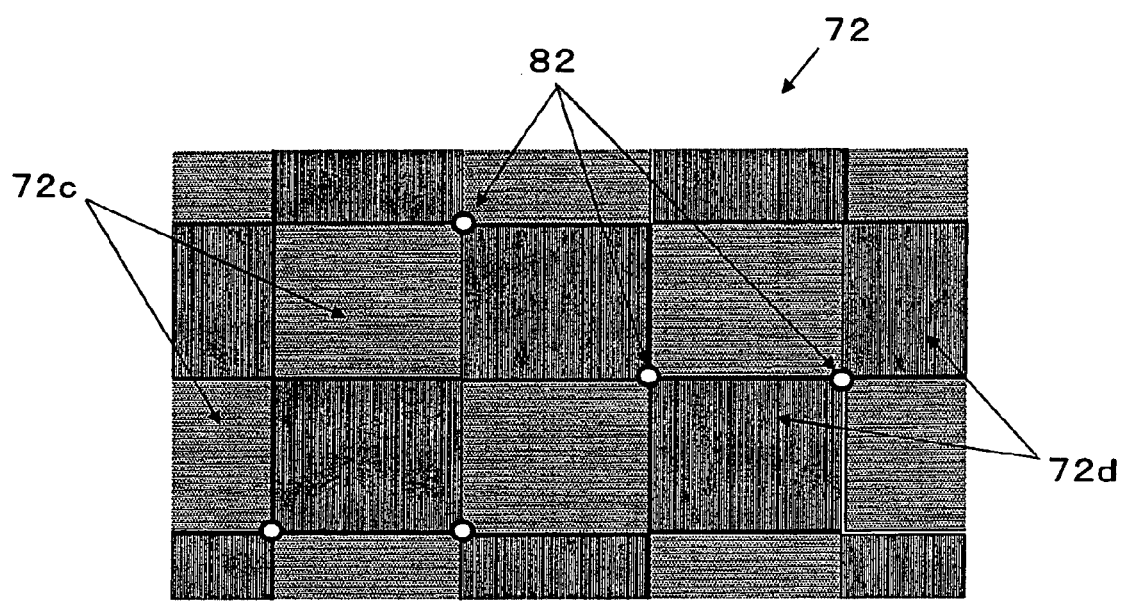
FIG. 17B is a plan view thereof.

The resin flow state in the above-described RTM molding will be explained based on FIG. 14 which is an enlarged view of the portion A of FIG. 18B. The epoxy resin 75 flown out from resin tank 91 is charged into runner for resin injection 88 provided on the lower die through resin injection port 85, and thereafter, the resin flows into the cavity from the runner 88 through the film gate which is a gap (about 1 mm) formed between the cavity and the runner 88. At that time, although the resin flows from the entire area in the thickness direction of the substrate 87, because the region of the random mat layer is lower in density than the region formed with the carbon fiber woven fabric and lower in flow resistance, the resin begins to flow mainly through the random mat layer 73. Because the carbon fiber woven fabric 72 disposed as a substrate for design is directly pressed to the upper die 83 and there is almost no gap between the woven fabric 72 and the upper die 83, the injected resin flows toward the upper die 83 mostly as the resin flown from the random mat layer 73 rather than the resin flowing through the gap, and this resin flows into the gap between the woven fabric 72 and the upper die 83. By this, even if the inside of the cavity was sucked at a vacuum condition, bubble 78 left in the weave texture portions of the woven fabric 72 and the gap between the woven fabric 72 and the upper die 83 were discharged to the outside of the cavity by the flow along the stream lines 75a to 75b. In particular, as shown in FIGS. 17A and 17B, residual bubbles 82, which have not been released, are likely to stay at the cross threaded points of warp yarns 72c and weft yarns 72d forming the woven fabric 72. Such bubbles were discharged to the outside of the cavity together with the above-described resin flow, thereby preventing occurrence of voids and pinholes.

EXAMPLE 5

Figure 16:
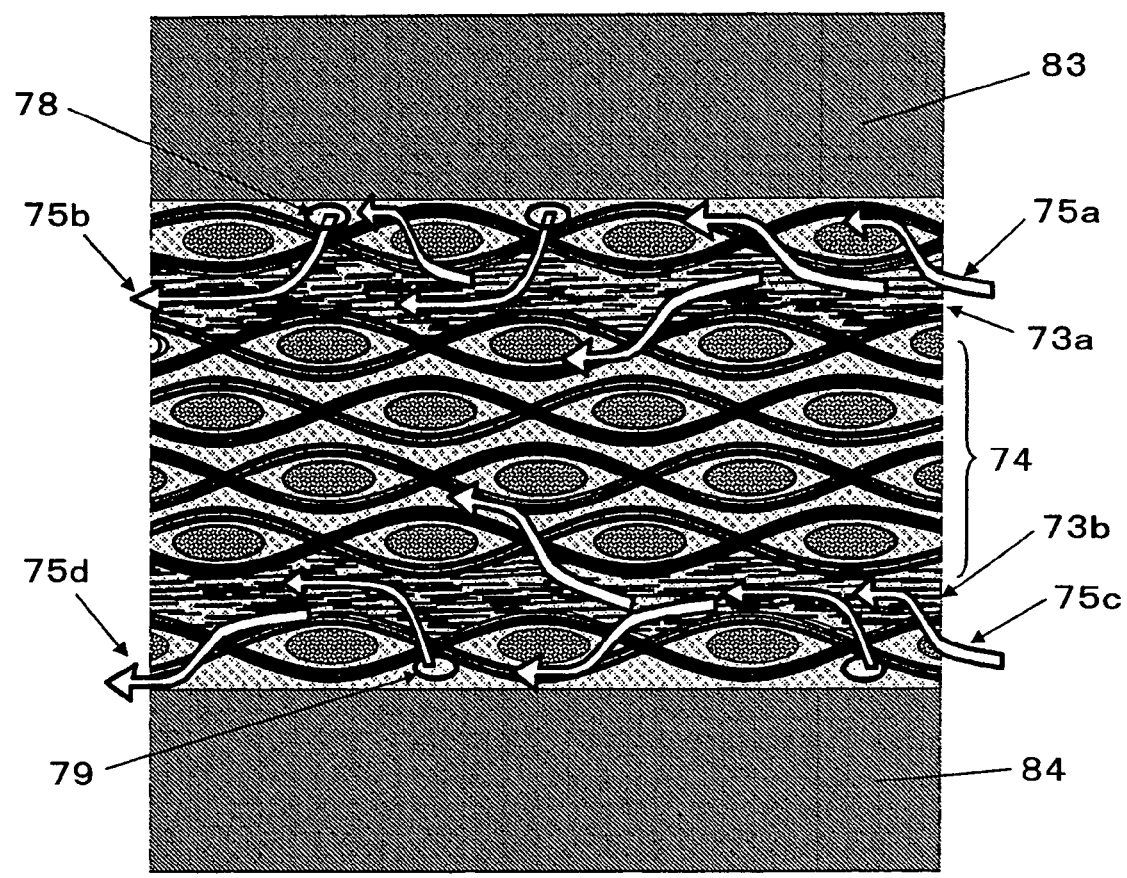
FIG. 16 is a partial sectional view showing an aspect at the time of injecting and impregnating resin into the substrate depicted in FIG. 15.

Although the above-described Example 4 was carried out as to a case where the design surface was only one surface, a fiber reinforced resin 76 as shown in FIG. 15 was molded. Namely, even in a case where a plurality of surfaces (in FIG. 15, upper and lower surfaces) are design surfaces and a high surface quality is required for all the surfaces, similarly to the above-described manner, it is preferred that random mat layers (73a, 73b) made of glass fiber mat with a weight of 30 g/m² is disposed immediately under the surface reinforcing fiber substrates (72a, 72b) forming the design surfaces, and the resin is injected at conditions similar to those described above. As shown in FIG. 16 which is an enlarged view of the portion A of FIG. 18B, by the flow from the stream line 75a to 75b and the flow from the stream line 75c to 75d, the resin having been flown through the random mat layers 73a and 73b flowed efficiently into the respective gaps between the surface substrate 72a and the upper die 83 and between the opposite-side surface substrate 72b and the lower die 84, and while the resin flowed without gap and the residual bubbles 78, 79 were discharged, the resin was filled and impregnated over the entire area. Therefore, for both the surface side and the back surface side, the bubbles were discharged to the outside of the cavity together with the above-described resin flows, and occurrence of void and pinholes could be prevented.

EXAMPLE 6

Figure 19:
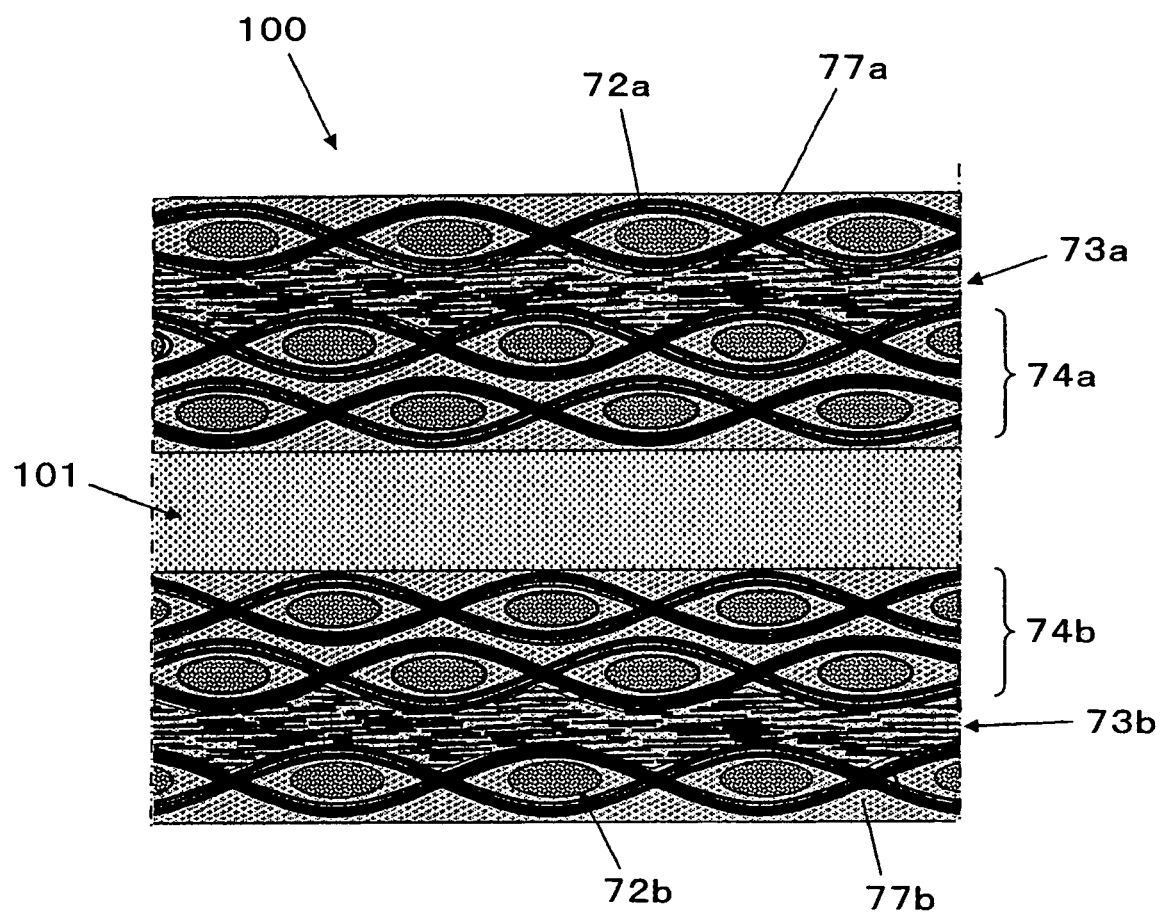
FIG. 19 is a partial sectional view showing a structure of a fiber reinforced resin according to another embodiment different from the embodiment depicted in FIG. 13.

As shown in FIG. 19, a sandwich structural material, wherein a polyurethane foam core 101 was provided in the central portion, on both surfaces a plurality of "TORAYCA" T300 woven fabrics CO6644B (weight: 300 g/m²) produced by Toray Industries, Inc. were stacked as reinforcing layers 74a, 74b, further thereon random mat layers 73a, 73b made of glass fibers (weight: 50 g/m²) were disposed, and "TORAYCA" T300 woven fabrics CO6343B (1 strand: 3K system, weight: 300 g/m²) produced by Toray Industries, Inc. were disposed as the respective outermost surface layers, was molded to a fiber reinforced resin 100 by the RTM molding method shown in FIG. 18A to FIG. 18C. The temperature of the mold (upper die 83, lower die 84) was set at 85° C. In the figure, symbols 77a, 77b indicate the epoxy resin injected, impregnated and cured. As a result, an FRP structural material having a sandwich structure could be molded particularly with a good surface quality (both surfaces).

COMPARATIVE EXAMPLE 2

As comparison with the above-described Examples, the random mat layer 73, which was disposed immediately under the surface layer 72 in Example 4, was removed, and the other fiber structure of the surface layer and the reinforcing fiber layer was set at the same structure. Further, RTM molding was carried out by completely the same molding conditions as those in the RTM molding method of Example 4.

In the result of the molding, because the random mat layer with a small resin flow resistance did not exist, the time when excessive resin flowed out to the suction port 86 after start of resin injection was taken long to be 1.38 times as compared with that in Example 4, but the molded product could be obtained. However, as shown in FIG. 17B, many pinholes 82, which had not been seen in Example 4, appeared at the portions of the weave texture and the cross threaded points of warp yarns and weft yarns, and it was not a good product in surface design quality.

In the above-described RTM molding method and device to improve the sealability at the resin injection part and/or the resin discharge part, the following structure can be employed. Although the device stands on the basis of assuming the aforementioned divided areas, the following explanation will be taken as to a simple molding model referring to FIGS. 20 to 23. This seal structure explained referring to FIGS. 20 to 23 can be applied to the RTM molding method and device, in particular, to the RTM molding method and device according to the aforementioned first and second embodiments.

Namely, in this structure, the tube for resin injection and/or the tube for resin discharge are provided at a condition nipped at the portions of the parting surfaces, and the portion between the tube and the die is sealed via an elastic material, and preferably, an end portion of an O-ring for sealing the cavity of the mold at positions of parting surfaces of dies is incorporated into the elastic material for seal. By nipping and fixing the tube for resin injection and/or the tube for resin discharge, for example, the resin injection member or the resin discharge member can be easily set or cleaned without using through holes for resin injection opened on the mold or sleeves, and consequently, the molding cycle can be shortened and a more efficient molding becomes possible. Further, by using cheap resin tubes as the above-described tubes and discarding the tubes after molding as they are, the cleaning operation can be greatly saved, and it can contribute to a cost down due to reduction of amount of operation. Furthermore, by using the elastic material for seal, keeping of a vacuum condition in the cavity and maintaining the vacuum during the molding can be made sure, and at the same time, because resin leakage can also be prevented, a high-quality product with no voids and no pinholes can be obtained.

Figure 20:
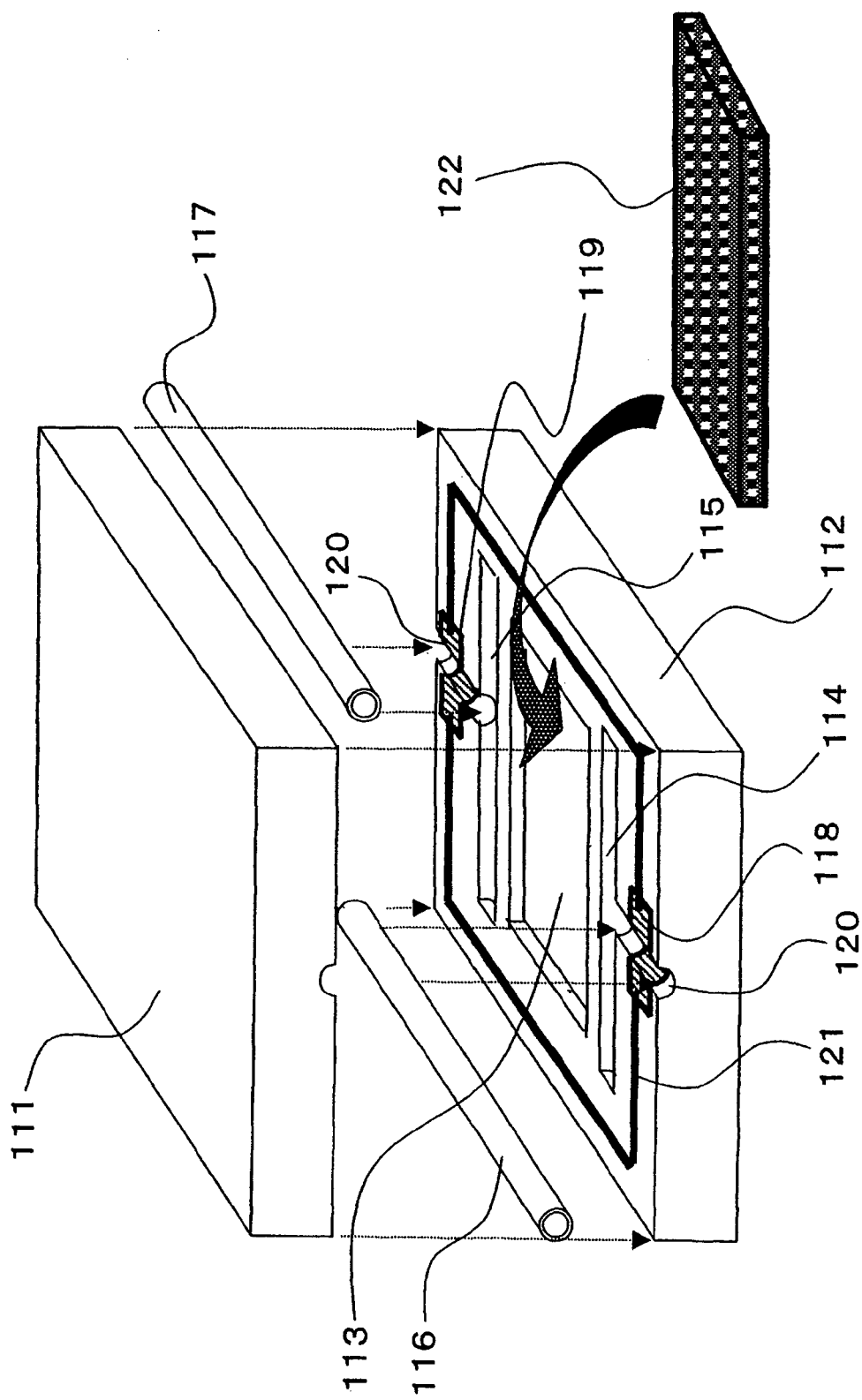
FIG. 20 is a schematic exploded perspective view of a mold showing an example of a structure for improving sealability in RTM molding method and device according.
Figure 21:
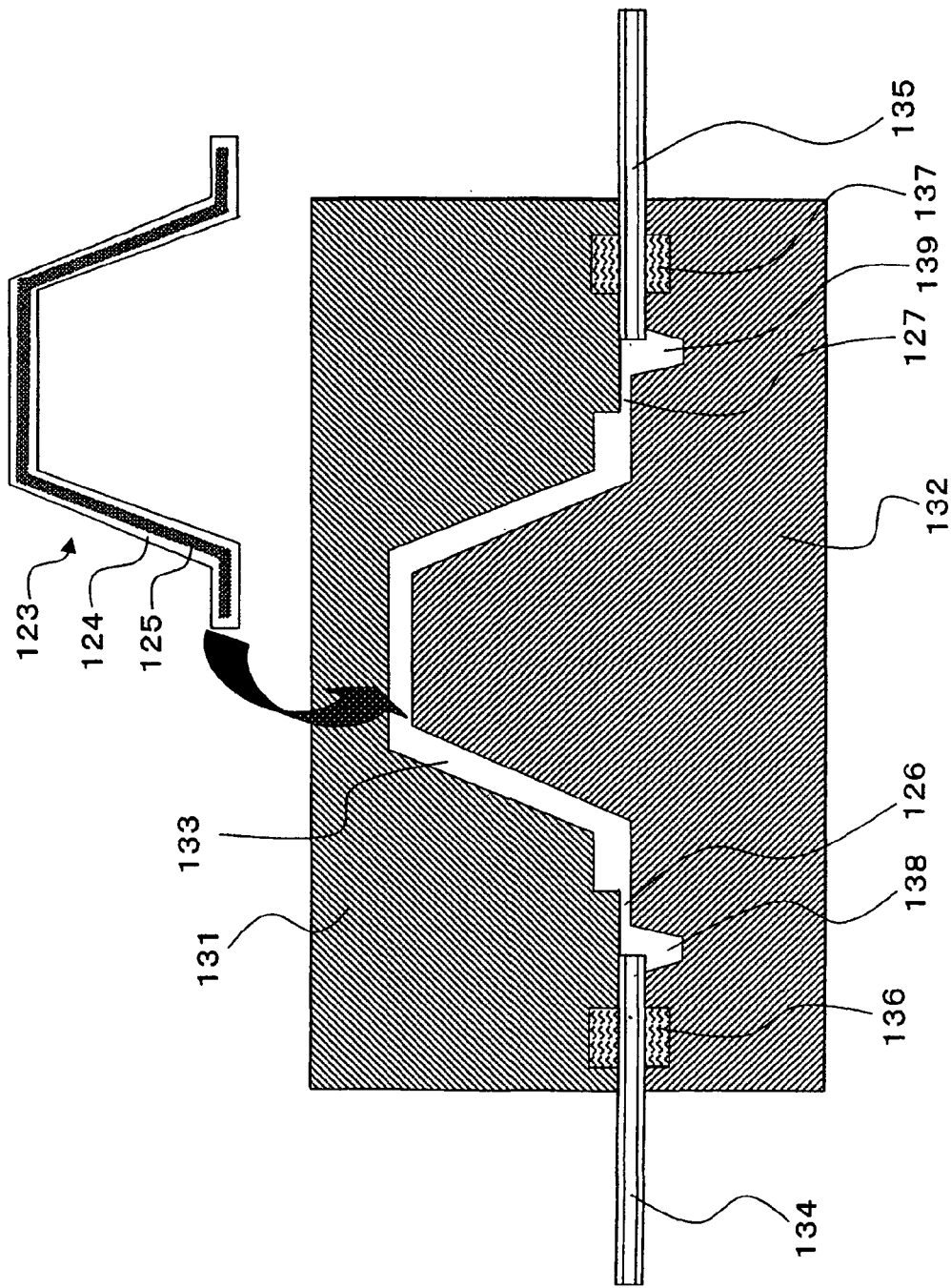
FIG. 21 is a vertical sectional view of a mold showing another example of a structure for improving sealability.

FIG. 20 is a perspective view of upper and lower dies 111, 112, FIG. 21 is an enlarged sectional view of the lower die, and FIG. 22 shows tube for resin injection•discharge 30 attached between the upper and lower dies, respectively. As shown in FIG. 20, a reinforcing fiber substrate 122 given with a product shape beforehand is placed in a molding cavity 113 of a lower die 112 in which an O-ring 121 is disposed at the outer circumference of the cavity 113 formed on the upper surface of the lower die 112. Next, on grooves 120, 120' having semi-cross sectional shapes of tube for resin injection 116 and tube for resin discharge 117 communicating with runner for resin injection 114 and runner for resin discharge 115 and on grooves formed on elastic materials 118, 119 provided on the ways of the grooves 120, 120', made of a rubber (for example, made of NBR) and communicating with the grooves 120, 120', resin injection members 140 as shown in FIG. 22, in each of which a metal tube 142 is inserted into a tube 141 coming into contact with the groove and is wound with a seal tape 143 around the outer surface at its tip portion, are disposed. Then, upper die is closed, the upper die 111 is pressed toward lower die 112, and the above-described resin injection members 140 are nipped. At such a state, hot water is filled in the pipes (not shown) provided in the mold to elevate in temperature the whole of the mold.

Then, after the inside of cavity 113 is set at a vacuum condition via tube for resin discharge 117 connected to a vacuum trap (not shown) communicating with a vacuum pump (not shown), the resin is injected at a pressurized condition into the cavity 113 via tube for resin injection 116. After completing the resin injection, the tube for resin injection 116 and the tube for resin discharge 117 are closed, and then, after the resin is heated and cured by the mold for a predetermined period of time, the mold is opened, and the FRP product is taken out.

Further, as another structure for improving the sealability is shown in FIG. 21, a reinforcing fiber preform material 123 having a sandwich structure, in which a core material 124 processed in a shape of a product and made of a foamed material covers the outer surface of a reinforcing fiber substrate 125, is placed in a molding cavity 133 formed by an upper die 131 and a lower die 132 disposed with elastic materials for seal 136, 137 communicating with an O-ring (not shown) disposed on the outer circumference of the cavity 133, and a tube for resin injection 134 and a tube for resin discharge 135 communicating a runner for resin injection 138 and a runner for resin discharge 139 are nipped by the upper and lower dies to seal them by bringing them into contact with the above-described elastic materials for seal 136, 137.

For the above-described tube for resin injection 134 and tube for resin discharge 135, for example, metal tubes are used. At such a condition, the mold is heated by flowing hot water in pipes (not shown) provided in the mold. Thereafter, similarly to that in the example shown in FIG. 20, after the inside of cavity 133 is set at a vacuum condition via tube for resin discharge 135 connected to a vacuum trap communicating with a vacuum pump, the resin is injected at a pressurized condition into the cavity 133 via tube for resin injection 134. After the pressurized resin is filled in runner for resin injection 138, the resin flows into cavity 133 disposed with the above-described reinforcing fiber preform material 123 through a film gate for injection 126, and the resin is impregnated into the reinforcing fibers of the reinforcing fiber preform material 123. During that, excessive resin flows out to a vacuum trap through tube for discharge 135 after being filled in runner for resin discharge 139 through a film gate for discharge 127. After completing the resin injection, the tube for resin injection 134 and the tube for resin discharge 135 are closed, and then, after the resin is heated and cured at that condition for a predetermined period of time, the mold is opened, and a hat-like high-rigidity FRP sandwich structural material is obtained.

FIG. 22 shows an example of the structure of tube for resin injection 116 or tube for resin discharge 117 used in the above-describe Example. Metal tube 142 is inserted into the tube for resin injection or the tube for resin discharge made of a resin, and seal tape 143 is applied to the outer surface. The metal tube 142 is not deformed by grooves 10, 10' processed in a shape of a semi-circle (smaller than the radius of the above-described respective tubes) on the upper and lower dies and elastic materials for seal 118, 119 when upper die 111 and lower die 112 are closed and the tube for resin injection (described as symbol 31) or the tube for resin discharge is nipped by the upper die and the lower die, and it exhibits an effect for maintaining the circular sectional shape of the tube for resin injection 116 or the tube for resin discharge 117 and smoothing the vacuum suction from the inside of the cavity and the resin flow.

Further, seal tape 143 enhances the sealability of the elastic material for seal by bringing the seal tape 143 into contact with the elastic material for seal when the upper die and the lower die are closed and the tube for resin injection or the tube for resin discharge is nipped by the upper die and the lower die, thereby improving the vacuum maintenance ability in the cavity stably. It is possible to omit it in a case where the elastic material for seal is disposed to each of the upper die and the lower die.

Although a plastic tube such as nylon, polyethylene, polypropylene or a fluorine contained resin such as "Teflon" (registered trade mark) can be used for the tube for resin injection or the tube for resin discharge, a metal tube made of iron, aluminum, brass, copper, stainless steel, etc. also can be used.

Further, for metal tube 142 inserted into the tip portion of the tube for resin injection or the tube for resin discharge, iron, aluminum, brass, copper or stainless steel is used. Further, a plastic tube such as ABS, polyethylene, polypropylene, nylon, vinyl chloride, acrylic, etc. also can be used. In any tube, the thickness is preferably 0.5 mm or more.

Furthermore, for seal tape 143 applied to the outer surface of the tip portion of the tube for resin injection or the tube for resin discharge, a tape made of a resin such as a fluorine contained resin such as "Teflon" (registered trade mark), nylon, polyester, polypropylene, etc. can be used. It is possible to omit it in a case where the elastic material for seal is disposed to each surface of the upper die and the lower die.

FIGS. 23A to 23F show a plurality of examples of relationships between the tube for resin injection and the tube for resin discharge and the elastic material for seal as cross-sectional views. For O-ring 154 and elastic material for seal 153, NBR, a fluorine contained resin such as "Teflon" (registered trade mark), etc. can be used, and a solid type or a hollow type can be used. Further, a foam material made of such resins also can be used.

Elastic material for seal 153 disposed on upper die 151 or lower die 152, or on both, ensures the sealability by projecting it slightly from the die surface provided with it, and generating a reactive force between the elastic material for seal 153 and the upper die 151 and the tube for resin injection 150 (or the tube for resin discharge) when the upper die 151 is closed and the elastic material for seal 153 is pressed and compressed by the die surface of the upper die 151.

Furthermore, by incorporating the end portion of O-ring 154 into elastic material for seal 153, the elastic material for seal 153 and the O-ring 154 are pressed to each other by the reactive force generated in the compressed elastic material for seal 153 and O-ring 154 when upper die 151 is closed, and while the continuous property of the seal (O-ring) is maintained, the vacuum condition in the cavity is ensured.

Hereinafter, the method for sealing the tube for resin injection and the tube for resin discharge will be explained using FIGS. 23A to 23F.

In the structure shown in FIG. 23A, a groove, having a curved surface with a curvature equal to the curvature of the above-described tube for resin injection 150 (or the tube for resin discharge) or smaller than the curvature of the tube for resin injection 150, is formed in the elastic material for seal 153, the elastic material for seal 153 on O-ring 154 is disposed in the upper die 151 and/or the lower die 152 with a portion processed at a shape corresponding to the elastic material for seal, the portion disposed with the tube for resin injection or tube for resin discharge 150 is cut at the center of the O-ring 154, and at a state where the elastic material for seal 153 is disposed in the upper die 151 and/or the lower die 152 with a portion processed at a shape corresponding to the elastic material for seal, the tube for resin injection or tube for resin discharge 150 is nipped by the upper die 151 and the lower die 152. At that time, by incorporating the end portion of the O-ring 154 into the elastic material for seal 153, the vacuum maintaining property in the cavity is ensured and a resin leakage is prevented.

In the structure shown in FIG. 23B, a groove, having a curvature equal to or smaller than the curvature of the above-described tube 150, is formed on each of the elastic material for seal 153 and the upper die 151, the elastic material for seal 153 on O-ring 154 is disposed in the lower die 152 with a portion processed at a shape corresponding to the elastic material for seal, the closed loop of O-ring 154 is cut at an O-ring extending position disposed with the tube for resin injection or tube for resin discharge 150, and at a state where the elastic material for seal 153 is disposed in the lower die 152 with a portion processed at a shape corresponding to the elastic material for seal, the tube for resin injection or tube for resin discharge 150 is nipped by the upper die 151 and the lower die 152. At that time, by incorporating the end portion of the O-ring 154 into the elastic material for seal 153, a resin leakage is prevented.

In the structure shown in FIG. 23C, the closed loop of O-ring 154 is cut at an O-ring extending position at which the tube for resin injection or tube for resin discharge 150 is also disposed on the upper die 151 or the lower die 152 formed with a groove having a curvature equal to or smaller than the curvature of the above-described tube 150, and by bringing the cut portion of the O-ring 154 into contact with the used tube, the vacuum maintaining property in the cavity is ensured and a resin leakage is prevented.

In the structure shown in FIG. 23D, upper die 152 formed with a groove having a curvature equal to or smaller than the curvature of the above-described tube 150, and elastic material for seal 153 formed as a continuous material of O-ring 154, are provided, the tube for resin injection or tube for resin discharge 150 is nipped, the vacuum maintaining property in the cavity is ensured and a resin leakage is prevented.

In the structure shown in FIG. 23E, a groove, having a curvature equal to or smaller than the curvature of the above-described tube 150, is formed on the upper die 151, O-ring 154 provided as a continuous material is disposed across the groove processed on the lower die 152 for disposing the tube for resin injection or tube for resin discharge 150 at a curvature equal to or larger than the curvature of the tube for resin injection or tube for resin discharge 150, and by disposing the tube for resin injection or tube for resin discharge 150 on the O-ring 154 and nipping it by the upper die 151 and the lower die 152, the vacuum maintaining property in the cavity is ensured and a resin leakage is prevented.

In the structure shown in FIG. 23F, a state without the upper die of FIG. 23A or FIG. 23B is shown, it is a plan view observing the relationship between elastic material for seal 153 and O-ring 154 for the upper side of the parting surface.

Thus, with respect to the portion of the tube for resin injection or the tube for resin discharge, various structures for improving the sealability can be employed.

Further, in the aforementioned RTM molding method and device, to enable to discharge small bubbles present in gaps of the substrate, etc., bubbles due to the evaporation of dissolved gas in the resin which are generated by reduction in pressure during resin injection, or fine bubbles staying in the corner portions of the mold, the following structure can be employed. Namely, a structure can be employed for discharging gas in the mold and excessive resin intermittently while injecting the resin into the mold at a pressurized condition, and by this, it becomes possible to cause the resin flow to adequately pulsate and to accelerate the discharge of the bubbles in the resin. In this structure, as to a resin pressure Pm in the mold and a resin discharge pressure Pi at an injection port, the flow rate of the resin flowing into the mold can be controlled by selective control between conditions of Pm=Pi and Pm<Pi, and the resin flow rate also can be controlled by adjustment of a diameter of a discharge port for discharging the resin. Further, a structure also can be employed wherein the adjustment of the diameter of the discharge port and a timing for the adjustment are stored in memory, and based on the stored information, the resin flow rate is automatically controlled.

In more detail, in a conventional method, a molding method has been employed wherein a reinforcing fiber substrate is disposed in a mold beforehand and the mold is closed, at a condition where an injection valve is closed, the inside of the mold is sucked at a vacuum condition by a vacuum pump through a discharge path communicating with an opened discharge valve, the resin pressure in the mold Pm is reduced preferably at 0.01 MPa or less, and successively, at a condition where the discharge valve is closed, the injection valve is opened and the resin is injected at a pressurized condition until the resin is completely charged into the mold from the resin injection path. In this method, however, because the discharge valve is being closed during resin injection, bubbles left in the weave textures of a woven fabric substrate provided as the reinforcing fiber substrate, bubbles left at a portion between laminated layers of the reinforcing fiber substrate, and further, bubbles generated by evaporation of gas dissolved in the resin injected into the mold in the heat molding process, are not discharged, and by a condition where such bubbles are molded as they are and fine bubbles are left in the molded product, there has been a case causing a great deterioration in quality of the product. In particular, in a case where such bubbles appear on the surface as voids and pits, it has become a defective product for a product requiring a design quality. To solve such a deterioration in quality of the product and the problem of occurrence of a defective product, it is necessary to appropriately discharge the gas (bubbles) left in the mold and generated by evaporation even in the resin injection process.

Accordingly, in the above-described method, while the pressurized resin is injected from the injection port, for example, by opening/closing the discharge valve provided on the discharge path or by changing the diameter, residual bubbles and excessive resin in the mold can be efficiently discharged intermittently. For example, in a case where the discharge valve is completely closed while the injection valve is opened to inject the resin, the condition becomes injection pressure Pi=resin pressure in the mold Pm, although the impregnation into the reinforcing fibers is facilitated because the pressure of the resin flowing into the mold is high, the staying bubbles are also compressed up to almost the same pressure as the resin pressure and they are being mixed in the resin. When the discharge valve is opened at this condition, the relationship becomes resin injection pressure Pi>resin pressure in the mold Pm, and the residual bubbles and the pressurized excessive resin in the mold are discharged from the discharge port simultaneously.

By setting an opening/closing speed of the discharge valve preferably at a speed within one second, the pressure in the mold reduces at a time by the opening/closing speed, and the residual gas expands rapidly. Then, a resin flow due to the pressure difference and in accordance with a change in volume of the gas is generated, the gas staying between reinforcing fiber substrates or in the corner portions of the mold cannot stay by this rapid resin flow, and the gas is discharged from the discharge port. The higher the reduction speed of the pressure in the mold Pm is, the quicker the change of the gas volume becomes, and by providing the impactive flow to the resin around the gas, residual gas is easily removed from its staying place. The gas once left is discharged integrally with the flow toward the discharge path. Next, the discharge valve is closed, and the resin is supplied from the injection valve.

By repeating such an intermittent opening/closing operation of the discharge valve (this operation is not always full opening/full closing), while the residual gas (bubbles) in the mold is discharged, finally the discharge valve is fully closed at a state of completing the discharge, after a condition applied with the resin injection pressure is maintained for a while, the injection valve is also fully closed and the resin filled in the mold is heated and cured. Although the resin is pressurized in this aspect, a similar effect can be obtained even by setting the injection pressure Pi at an atmospheric pressure and setting the inside of the mold at a negative pressure.

The method for thus changing the pressure in the mold from Pi or a negative pressure instantaneously can also be realized, for example, by a momentary switching between a vacuum pump connected to a resin trap and a air pressurizing pump. Further, a more efficient discharge of bubbles is possible by controlling the speed for changing the resin pressure in the mold Pm by adjusting the opening degree of the discharge valve provided on the discharge path.

Further, as to the above-described discharge valve, by storing in memory the cycle of its opening/closing operation beforehand, for example, by inputting it in a computer beforehand, and by operating the valve based on the stored information, the problems in the conventional molding can be solved without increase of manpower.

Furthermore, by inputting the resin injection condition and an optimum opening/closing condition of the discharge valve in accordance with the resin flow condition in advance, an optimum resin flow in accordance with a change of environment (temperature of atmosphere, etc.) and the like can be realized.

By such a method, an FRP molded product, in which voids and pits concerning the surface design quality do not exist or are extremely few that has been difficult to be realized in the conventional method, can be obtained. By this, desirable mechanical properties can be always satisfied stably, an excellent surface quality can be obtained stably, and the production can be carried out with a yield better than that in the conventional method.

Further, in the aforementioned RTM molding method and device, to mold a product with a high surface quality efficiently in a short period of time, the following method can be employed. Namely, there are a vertical parting type and a horizontal parting type in RTM molds, and in the vertical parting type (frequently used for injection molding), there is an advantage that occurrence of voids and pits causing a problem on surface quality of molded product is very few because the resin flow is easily made uniform by the influence of gravity and bubbles in the mold are easily released by rising, but there is a big problem that the productivity is low because it is difficult to set a fiber reinforcing substrate in the mold, namely, to dispose the substrate onto the cavity surface of the mold without disturbance and to fix it onto the mold surface and a much time is required therefor. On the other hand, in the horizontal parting type, namely, in the structure where the mold is formed by upper and lower dies, there is an advantage that the setting of the reinforcing fiber substrate onto the mold surface is relatively easy and the setting time is short, but in a general resin injection method, that is, in a case where the resin is pressurized at a pressure of 0.2 to 1.0 MPa and the resin is injected without particularly controlling the flow rate, the resin flows into the mold at a flow rate depending on the pressure, the resin is charged into the mold in a relatively short period of time, however, there is a case where the reinforcing fiber substrate is disturbed by the resin flow, there occurs an uniform flow with a high flow rate, and many voids and pits are generated on the surface of the molded product. In particular, in a case where the resin is injected at a high discharge pressure of 0.5 MPa or more (therefore, at a high speed) to shorten the molding time or mold a product with a large area in a short period of time, a disturbance of the weave structure of the substrate (particularly, a plain weave woven fabric) is liable to occur, and because the resin flows in the mold at a high speed, the flow resistance varies within the flowing region in accordance with a fine unevenness in thickness or difference in structure of the substrate and a uniform flow cannot be maintained, and therefore, there is a case where a large void is generated by occurrence of a local forestalling of the resin flow and the like. Furthermore, there is a case where the resin actually flows up to the substrate portion, but, because the flow rate is high, for example, there is no time for release of gas present in the texture of the woven fabric and the gas stays there, and the gas generates a surface defect as a pit. In such conventional molding condition and molding process causing reduction of quality in appearance concerning the design quality, it is difficult to ensure a high surface quality while carrying out a high-speed injection for shortening the molding time. The larger the size of a product to be molded becomes, the more frequently such a defect on quality in appearance is liable to occur, because a high-speed resin injection is to be inevitably employed.

Because the flow state of resin greatly influences generation of such voids and pits concerning design quality, the density of the reinforcing fiber substrate, that is, the weight thereof, also becomes an important factor. Namely, because a weight of reinforcing fibers per one layer influences a flow resistance of resin and easiness of gas release, it is necessary to set a proper weight in accordance with the resin flow condition. This proper weight has to be set from the viewpoints of not only the surface quality but also the workability and utilization factor in strength of a preform. Namely, if the weight is too great and the rigidity of the substrate becomes high, the reinforcing fiber substrate becomes hard to be situated along the mold surface and hard to be formed in a three-dimensional shape, and there is a case where it takes much working time to make a preform, or that at that time disturbance of the substrate occurs and the mechanical properties of the FRP molded product decrease. Namely, to carry out an efficient production, there is a proper weight corresponding to the production conditions (molding size shape, molding conditions, etc.).

Further, among molding conditions, particularly influence given to a surface quality by temperature and resin injection pressure is great. If a temperature of injected resin is high, the resin viscosity reduces and the flowability of the resin increases, and although the impregnation property of the resin into the substrate is good, the flowability rapidly deteriorates by a high elevation rate of the viscosity, and when the molded product is big, there is a case where the flow of the resin reduces in speed on the way of the molding and it causes a non-impregnated portion. Even if the resin can flow over the entire area, in an area in which the viscosity has become high, there is a case where many voids and pits are generated even though non-impregnated portions are not generated. On the other hand, if there is an unevenness of the temperature of a mold or there is a change in the temperature during molding, there is a case where very fine bubbles remaining in the mold come into contact with each other and they grow a big bubble developing to a void or a pit. Further, it is important that the pressure is also adequate. There is a case where that a too high pressure causes an expansion in volume in a cavity to generate bubbles, or a too low pressure causes a state where residual bubbles cannot be compressed to be small.

Further, since a reactive gas may be generated from a reactive resin in its curing process, or fine gas (bubbles) having been contained in a resin may grow to voids or pits as the molding time passes, it is better to cure the resin as quickly as possible after the resin is impregnated into the substrate. The influence given to the efficiency of the molding by the characteristics of the material of the reactive resin is very high, and for example, depending upon the kind of the curing agent, the reaction speed becomes maximum at an initial period of the reaction of the resin, and as the time passes, the reaction speed reduces, and therefore, there is a case where the time required for curing becomes long. On the contrary, if the curing time is to be shortened by elevating the temperature of the mold, there is a case where the initial viscosity increases too high, the viscosity is elevated too much at the time of resin injection and flow, ultimately the resin is gelated, and the molding is stopped on the way and a non-impregnated portion is generated.

Thus, in FRP molding (particularly, RTM molding), there exist proper molding conditions and material characteristic in accordance with molding size (area), and if not molded at proper conditions, problems on quality, in particular, on surface quality, are liable to occur.

Accordingly, in the RTM molding method and device, in particular, to mold a product with almost no voids and pits and having a high surface design quality efficiently in a short period of time, a method can be employed wherein, when the resin is injected into the cavity of the mold at a pressurized condition, a ratio of a flow rate of the resin per a unit time (Q: cc/min.) to a projected area of the cavity (S: m$^2$) (Q/S: cc/min.·m$^2$) is in a range of 50<Q/S<600.

In this method it is preferred that the product of the above-described ratio (Q/S: cc/min.·m$^2$) and a pressurizing force of the resin (P: MPa) ((Q/S)xP: ccMPa/min.·m$^2$) is in a range of $20 \leq (Q/S) \times P \leq 400$. Further, it is preferred that the pressurizing force of the resin is in a range of 0.2 to 0.8 MPa, and the resin is preferably cured for 3 to 30 minutes at a constant heating temperature in a range of 60 to 160° C.

By such RTM molding conditions, a molded product, in which defects such as voids and pits are not generated on the surface formed as a design surface, that has been difficult to be realized by the conventional RTM molding conditions, can be molded efficiently in a short period of time and stably, and the molded product high in surface quality can be produced at a high cycle and at a large scale.

INDUSTRIAL APPLICATIONS

The RTM molding method and device can be applied to any RTM molding requiring a high-speed molding and, in particular, the device is useful to mold a relatively large product relatively complicated in shape, efficiently in a short period of time with an excellent surface quality, particularly for molding an excellent design surface.

In more detail, the device is suitable for a relatively large FRP panel member for general industries having a product size of 1 m$^2$ or more, in particular, for an outer panel member or a structural material for vehicles, and among these, it is suitable for RTM molding of an FRP member used as an outer panel member highly requiring a design quality. The outer panel member for vehicles means a so-called panel member such as a door panel or a food in a car or a truck, a roof, a trunk lid, a fender, a spoiler, a side skirt, a front skirt, a mud guard or a door inner panel. In particular, it is suitable for a relatively large panel member requiring a design quality. As other FRP panel members, are raised a member for aircraft, various panels in trains such as a door, a side panel or an interior panel, cover members for construction machines such as a crane, a partition, a door panel or a shield plate in a construction field, and further, an outer surface panel such as a surfboard or a skateboard in a sport field, or parts for bicycles.

The invention claimed is:
1. An RTM molding method comprising:
disposing a reinforcing fiber substrate in a cavity of a mold consisting of a pair of dies, wherein an intermediate member having resin paths extending through said intermediate member in its thickness direction and having grooves for resin paths formed on its upper surface and through holes communicating with said grooves and extending to its reinforcing fiber substrate disposed-side surface opposite to said upper surface through said intermediate member is disposed between upper and lower dies forming said mold, liquid thermosetting resin is injected to said reinforcing fiber substrate from a plurality of positions via said intermediate member almost simultaneously, and a groove for discharging said resin which extends substantially over the entire circumference of said reinforcing fiber substrate, is formed on said lower die,
clamping said mold,
carrying out vacuum suction from a resin discharge line for a predetermined period of time of at least from a time after clamping said mold to a time starting resin injection, and
injecting said resin to complete molding,
wherein 1) divided areas with respect to a surface direction of said reinforcing fiber substrate are assumed, each divided area is one in which injected resin expands over the entire surface in said each divided area and can be substantially uniformly impregnated in a thickness direction of said substrate, and resin introducing paths are formed for respective assumed divided areas for introducing the injected resin into said respective divided areas, 2) a member for resin injection communicates with a groove formed on an upper surface of the intermediate member and 3) a member for resin dis- charge is nipped and sealed by the intermediate member and a lower die facing the intermediate member via the reinforcing fiber substrate.

2. The RTM molding method according to claim 1, wherein a groove for discharging resin, which extends substantially over the entire circumference of said reinforcing fiber substrate, is formed on said intermediate member.

3. The RTM molding method according to claim 1, wherein said intermediate member is made from a metal or a resin.

4. The RTM molding method according to claim 1, wherein a core material is laminated to said reinforcing fiber substrate.

5. The RTM molding method according to claim 1, wherein a tube for resin injection and/or a tube for resin discharge is provided being nipped between parting surfaces of dies, and portions between said tube and said dies are sealed with an elastic material.

6. The RTM molding method according to claim 5, wherein an end portion of an O-ring for sealing said cavity of said mold at positions of parting surfaces of dies is incorporated into said elastic material for seal.

7. The RTM molding method according to claim 1, wherein, while resin is injected into said mold at a pressurized condition, gas and excessive resin in said mold are discharged intermittently.

8. The RTM molding method according to claim 7, wherein, when a resin pressure in said mold of resin pressurized and injected is referred to as Pm and a resin discharge pressure at an injection port for injecting resin is referred to as Pi, a flow rate of resin flowing into said mold is controlled by selective control between conditions of Pm=Pi and Pm<Pi.

9. The RTM molding method according to claim 7, wherein a flow rate of resin flowing into said mold is controlled by adjustment of a diameter of a discharge port for discharging resin.

10. The RTM molding method according to claim 9, wherein said adjustment of said diameter of said discharge port and a timing for said adjustment are stored in memory, and based on the stored information, said flow rate of resin flowing into said mold is automatically controlled.

11. The RTM molding method according to claim 1, wherein, when resin is injected into said cavity of said mold at a pressurized condition, a ratio of a flow rate of resin per a unit time (Q: cc/min.) to a projected area of said cavity (S: m$^2$) (Q/S: cc/min.·m$^2$) is in a range of $50<Q/S<600$.

12. The RTM molding method according to claim 11, wherein the product of said ratio (Q/S: cc/min.·m$^2$) and a pressurizing force of resin (P: MPa) ((Q/S)xP: ccMPa/min.·m$^2$) is in a range of $20 \leq (Q/S)xP \leq 400$.

13. The RTM molding method according to claim 11, wherein a pressurizing force of resin is in a range of 0.2 to 0.8 MPa.

14. The RTM molding method according to claim 11, wherein said resin is cured for 3 to 30 minutes at a constant heating temperature in a range of 60 to 160° C.

15. An RTM molding method comprising:
disposing a reinforcing fiber substrate in a cavity of a mold consisting of a plurality of dies, wherein an intermediate member having resin paths extending through said intermediate member in its thickness direction is made of a perforated plate or resin film provided with a plurality of through holes and is disposed between dies forming said mold, liquid thermosetting resin is injected to said reinforcing fiber substrate from a plurality of positions via said intermediate member almost simultaneously, and a groove for discharging said resin which extends substantially over the entire circumference of said reinforcing fiber substrate, is formed on any one of said dies, clamping said mold, and thereafter
injecting said resin to complete molding,
wherein 1) divided areas with respect to a surface direction of said reinforcing fiber substrate are assumed, each divided area is one in which injected resin expands over the entire surface in said each divided area and can be substantially uniformly impregnated in a thickness direction of said substrate, and resin introducing paths are formed for respective assumed divided areas for introducing the injected resin into said respective divided areas, 2) a groove for a resin path having a depth of 3-5 mm is provided on a die facing said intermediate member, 3) a gap is formed between said intermediate member and a die facing said intermediate member, and said gap is set in a range of 1 to 10 mm, 4) a member for resin injection communicates with a groove formed on the intermediate member and is nipped and sealed by the intermediate member and a die facing the intermediate member, and 5) a member for resin discharge is nipped and sealed by the intermediate member and a die facing the intermediate member via the reinforcing fiber substrate.

16. An RTM molding device for disposing a reinforcing fiber substrate in a cavity of a mold consisting of:
a pair of dies, wherein an intermediate member having resin paths extending through said intermediate member in its thickness direction and having grooves for resin paths formed on its upper surface and through holes communicating with said grooves and extending to its reinforcing fiber substrate disposed-side surface opposite to said one surface through said intermediate member is disposed between upper and lower dies forming said mold for injecting liquid thermosetting resin to said reinforcing fiber substrate from a plurality of positions via said resin paths almost simultaneously,
a groove for discharging resin, which extends substantially over the entire circumference of said reinforcing fiber substrate, is formed on said lower die,
a clamp for said mold,
a mold cavity has divided areas with respect to a surface direction of said reinforcing fiber substrate, each divided area being one in which injected resin expands over the entire surface in said each divided area and can be substantially uniformly impregnated in a thickness direction of said substrate,
resin introducing paths formed for respective assumed divided areas that introduce the injected resin into said respective divided areas,
a device that carries out vacuum suction from a resin discharge line for a predetermined period of time of at least from a time after clamping said mold to a time starting resin injection,
a member for resin injection that communicates with a groove formed on an upper surface of the intermediate member and which is nipped and sealed by the intermediate member and an upper die facing the intermediate member, and
a member for resin discharge which is nipped and sealed by the intermediate member and a lower die facing the intermediate member via the reinforcing fiber substrate.

17. The RTM molding device according to claim 16, wherein a groove for discharging resin, which extends substantially over the entire circumference of said reinforcing fiber substrate, is formed on said intermediate member.

18. The RTM molding device according to claim 16, wherein said intermediate member is made from a metal or a resin.

19. The RTM molding device according to claim 16, wherein a core material is laminated to said reinforcing fiber substrate.

20. The RTM molding device according to claim 16, wherein a tube for resin injection and/or a tube for resin discharge is provided being nipped between parting surfaces of dies, and an elastic material for seal is interposed between said tube and said dies.

21. The RTM molding device according to claim 20, wherein an end portion of an 0-ring for sealing said cavity of said mold at positions of parting surfaces of dies is incorporated into said elastic material for seal.

22. The RTM molding device according to claim 16, wherein means for, while injecting resin into said mold at a pressurized condition, discharging gas and excessive resin in said mold intermittently is provided.

23. The RTM molding device according to claim 22, wherein, when a resin pressure in said mold of resin pressurized and injected is referred to as Pm and a resin discharge pressure at an injection port for injecting resin is referred to as Pi, means for controlling a flow rate of resin flowing into said mold by selective control between conditions of Pm=Pi and Pm<Pi is provided.

24. The RTM molding device according to claim 22, wherein means for controlling a flow rate of resin flowing into said mold by adjusting a diameter of a discharge port for discharging resin is provided.

25. The RTM molding device according to claim 24, wherein means for storing in memory said adjustment of said diameter of said discharge port and a timing for said adjustment, and based on the stored information, automatically controlling said flow rate of resin flowing into said mold, is provided.

26. The RTM molding device according to claim 24, wherein said means for adjusting said diameter of said discharge port comprises a valve opening/closing device.

27. An RTM molding device for disposing a reinforcing fiber substrate in a cavity of a mold consisting of a plurality of dies, wherein an intermediate member having resin paths extending through said intermediate member in its thickness direction is made of a perforated plate or resin film provided with a plurality of through holes and is disposed between dies forming said mold for injecting liquid thermosetting resin to said reinforcing fiber substrate from a plurality of positions via said resin paths almost simultaneously, and a groove for discharging said resin which extends substantially over the entire circumference of said reinforcing fiber substrate, is formed on any one of said dies, a clamp for said mold, a mold cavity has divided areas with respect to a surface direction of said reinforcing fiber substrate, each divided area being one in which injected resin expands over the entire surface in said divided area and can be substantially uniformly impregnated in a thickness of said substrate, resin introducing paths formed for respective assumed divided areas that introduce the injected resin into said respective divided areas, wherein 1) a groove for a resin path is provided on a die facing said intermediate member, 2) wherein a gap having a depth of 3 to 5 mm is formed between said intermediate member and a die facing said intermediate member, and said gap is set in a range of 1 to 10 mm, 3) a member for resin injection communicates with a groove formed on the intermediate member and is nipped and sealed by the intermediate member and a die facing the intermediate member, and 4) a member for resin discharge is nipped and sealed by the intermediate member and a die facing the intermediate member via the reinforcing fiber substrate.

* * * * *

UNITED STATES PATENT AND TRADEMARK OFFICE
CERTIFICATE OF CORRECTION

| | | |
|---|---|---|
| PATENT NO. | : 7,943,078 B2 | Page 1 of 1 |
| APPLICATION NO. | : 10/589589 | |
| DATED | : May 17, 2011 | |
| INVENTOR(S) | : Sekido et al. | |

It is certified that error appears in the above-identified patent and that said Letters Patent is hereby corrected as shown below:

In Column 7

At line 36, please change "RIM" to --RTM--.

Signed and Sealed this
Sixth Day of December, 2011

David J. Kappos
*Director of the United States Patent and Trademark Office*